United States Patent
Khinvasara

(10) Patent No.: US 12,211,216 B2
(45) Date of Patent: Jan. 28, 2025

(54) OBJECT DETECTION IN IMAGE STREAM PROCESSING USING OPTICAL FLOW WITH DYNAMIC REGIONS OF INTEREST

(71) Applicant: NVIDIA Corporation, Santa Clara, CA (US)

(72) Inventor: Tushar Khinvasara, Pune (IN)

(73) Assignee: NVIDIA Corporation, Santa Clara, CA (US)

( * ) Notice: Subject to any disclaimer, the term of this patent is extended or adjusted under 35 U.S.C. 154(b) by 354 days.

(21) Appl. No.: 17/584,151

(22) Filed: Jan. 25, 2022

(65) Prior Publication Data

US 2023/0237671 A1 Jul. 27, 2023

(51) Int. Cl.
*G06T 7/20* (2017.01)
*G06T 3/40* (2024.01)
*G06V 10/22* (2022.01)
*G06V 10/764* (2022.01)

(52) U.S. Cl.
CPC ............ *G06T 7/20* (2013.01); *G06T 3/40* (2013.01); *G06V 10/22* (2022.01); *G06V 10/764* (2022.01); *G06T 2200/28* (2013.01); *G06T 2207/30248* (2013.01)

(58) Field of Classification Search
None
See application file for complete search history.

(56) References Cited

U.S. PATENT DOCUMENTS

| | | | | |
|---|---|---|---|---|
| 2017/0109592 A1* | 4/2017 | Hwang | ............... | G06V 10/25 |
| 2020/0258254 A1* | 8/2020 | Packwood | ............... | G06T 7/11 |
| 2022/0147751 A1* | 5/2022 | Vitek | ............... | G06F 18/2163 |
| 2022/0215201 A1* | 7/2022 | Dwivedi | ............... | G06N 3/045 |

OTHER PUBLICATIONS

Lee, S.-K. Lee and S.-I. Yang, "An Ensemble Method of CNN Models for Object Detection," 2018 International Conference on Information and Communication Technology Convergence (ICTC), Jeju, Korea (South), 2018, pp. 898-901, doi: 10.1109/ICTC.2018. 8539396 (Year: 2018).*

A. Anbu, G. Agarwal and G. Srivastava, "A fast object detection algorithm using motion-based region-of-interest determination," 2002 14th International Conference on Digital Signal Processing Proceedings. DSP 2002 pp. 1105-1108 vol. 2, doi: 10.1109/ICDSP. 2002.1028285 (Year: 2002).*

M. Tourapis, O. C. Au and M. L. Liou, "Predictive Motion Vector Field Adaptive Search Technique (PMVFAST)-Enhancing Block Based Motion Estimation", Proceedings of Visual Communications and Image Processing 2001 (VCIP 2001), 2001 (Year: 2001).*

(Continued)

*Primary Examiner* — Vu Le
*Assistant Examiner* — Charles C L Penny
(74) *Attorney, Agent, or Firm* — LOWENSTEIN SANDLER LLP

(57) ABSTRACT

Disclosed are apparatuses, systems, and techniques that may perform efficient deployment of machine learning for detection and classification of moving objects in streams of images. A set of machine learning models with different input sizes may be used for parallel processing of various regions of interest in multiple streams of images. Both the machine learning models as well as the inputs into these models may be selected dynamically based on a size of the regions of interest.

20 Claims, 13 Drawing Sheets

(56) References Cited

OTHER PUBLICATIONS

A. M. Tourapis, O. C. Au and M. L. Liou, "Predictive Motion Vector Field Adaptive Search Technique (PMVFAST)-Enhancing Block Based Motion Estimation", Proceedings of Visual Communications and Image Processing 2001 (VCIP 2001), 2001 (Year: 2001).*

A. Anbu, G. Agarwal and G. Srivastava, "A fast object detection algorithm using motion-based region-of-interest determination," 2002 14th Int. Conf. on Digital Signal Processing Proceedings. DSP 2002 (Cat. No. 02TH8628), Santorini, Greece, 2002, pp. 1105-1108 vol. 2, doi: 10.1109/ICDSP.2002.1028285 (Year: 2002).*

D. Erhan, C. Szegedy, A. Toshev, and D. Anguelov, "Scalable object detection using Deep Neural Networks," 2014 IEEE Conference on Computer Vision and Pattern Recognition, Jun. 2014. doi:10.1109/cvpr.2014.276 (Year: 2014).*

* cited by examiner

OBJECT DETECTION IN IMAGE STREAM PROCESSING USING OPTICAL FLOW WITH DYNAMIC REGIONS OF INTEREST

TECHNICAL FIELD

At least one embodiment pertains to processing resources used to perform and facilitate artificial intelligence. For example, at least one embodiment pertains to efficient deployment of machine learning for detection and classification of moving objects in streams of images, according to various novel techniques described herein.

BACKGROUND

Machine learning is often applied to image processing pipelines and applications, such as to perform identification of objects depicted within images. In some applications, object identification may be performed in real-time, in particular, in applications involving recognition and monitoring of moving objects. Such applications may be used in industrial safety settings, public safety settings, surveillance systems, traffic monitoring applications, science research, autonomous driving systems, robotic automation, and various other settings. Detection of moving objects may be based on machine learning and may involve training a computing system—using training images and other training data—to identify common features, arrangements, or patterns in images that may facilitate object identification. Training can be supervised or unsupervised. Machine learning models can use various computational algorithms, such as decision tree algorithms (or other rule-based algorithms), artificial neural networks, and the like. During inference stage, a new image is input into a trained machine learning model, and various target objects of interest (e.g., vehicles in an image of a roadway) can be identified using patterns and features the machine learning model learned to recognize during training.

BRIEF DESCRIPTION OF DRAWINGS

FIG. 4A illustrates a situation where a size of a region of interest is less than the smallest detection model input size; FIG. 4B illustrates a situation where the size of the region of interest is between two detection model input sizes; FIG. 4C illustrates a situation where the size of the region of interest is above the maximum detection model input size;

DETAILED DESCRIPTION

Figure 1A:
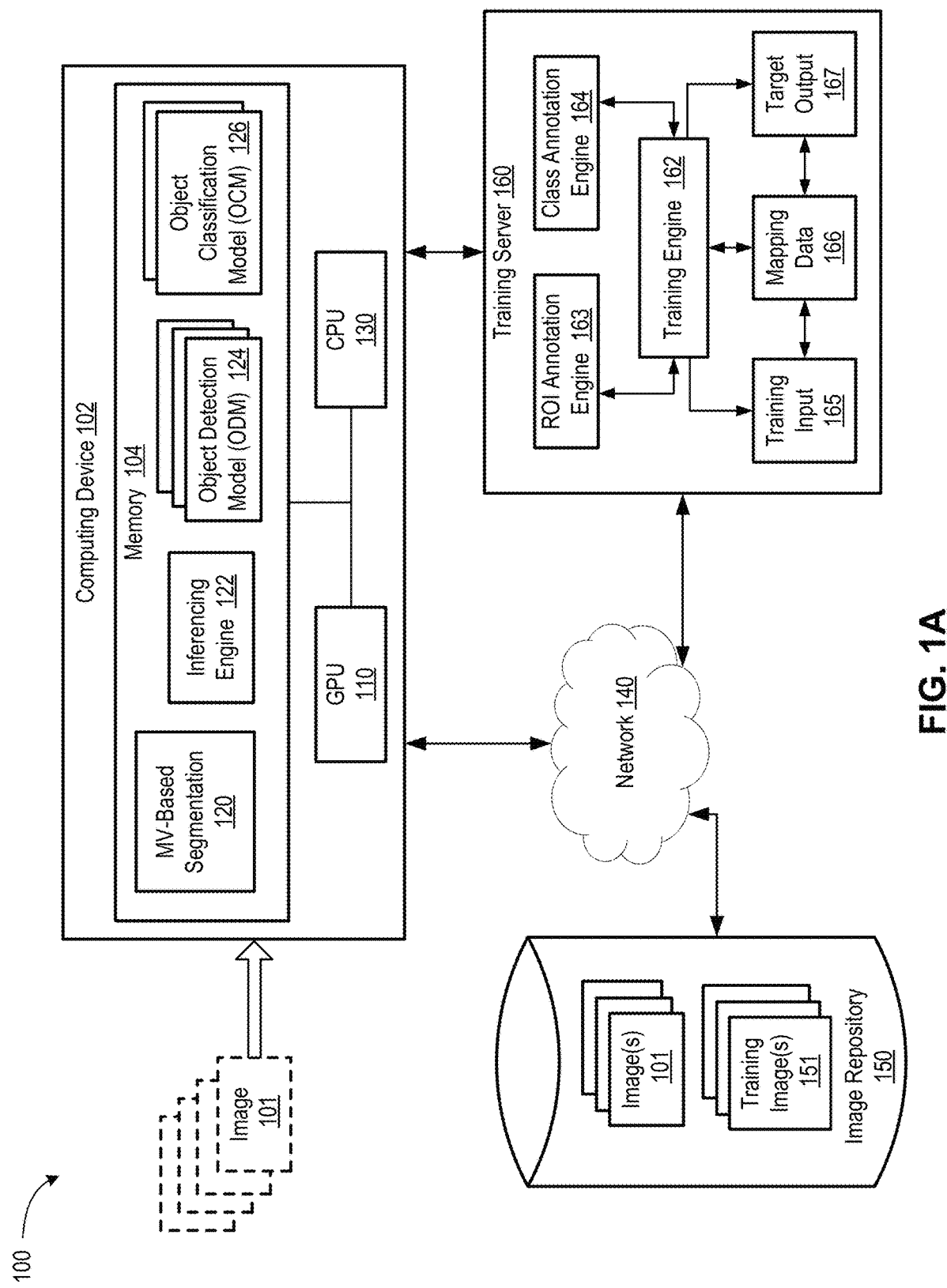
FIG. 1A is a block diagram of an example computer system that uses machine learning for efficient motion vector-based detection and classification of moving objects, in accordance with at least some embodiments.

Automated recognition objects is used in numerous technologies and industries, including but not limited to autonomous driving/parking systems, traffic/parking control and enforcement, robotic operations, aerospace technologies, and many other applications. In one example, recognition objects can be used in traffic monitoring that involves multiple cameras positioned at various intersections, roadways, entrances and exits of parking zones and structures, and the like. Each camera may produce a stream of images (e.g., video frames) that may (at some times) or may not (at other times) capture depictions of stationary or moving objects. The streams of images can then be processed by a variety of computer-based object recognition techniques to identify presence (or absence) of moving objects in the streams. For example, various frames of the streams may be processed using one or more machine learning models (MLMs) that may detect the presence of a vehicle (pedestrian, animal, or any other moving object) within a field of view of the camera and may also determine a type (e.g., pedestrian, passenger car, truck, etc.) to which the object belongs, a make of the vehicle (e.g., car manufacturer), a model of the vehicle, and so on. A trained MLM may include a neural network of artificial neurons having a certain number of neurons in the input layer, e.g., n×m. The number of the neurons may be associated with a size of the inputs (e.g., in pixels) that the MLM(s) can process. For example, a black-and-white frame may have a single value (pixel brightness) associated with each pixel. A color frame may have multiple values (e.g., one for each color, such as red, green, and blue) associated with each pixel. A frame size N×M, however, can be different from (e.g., greater than) the MLM input size. A preprocessing stage may, therefore, perform a rescaling of the frame, e.g., from N×M pixels to n×m pixels to match the size of the frame to the input size of the MLM. The rescaling may be performed on each new frame and can consume significant computational (e.g., processor and memory) resources. Additionally, as the MLM processes the rescaled frame as a whole, a substantial portion of these resources is spent processing parts of the frame that depict no moving objects.

Aspects and embodiments of the present disclosure address these and other technological challenges by disclosing methods and systems that enable efficient dynamic processing of streams of images by identifying a reduced portion of a frame that includes depictions of (e.g., moving) objects and discards at least a portion of a static background.

As a reduced portion of the frame is selected for processing, based on the actual locations of the objects, computational load is decreased considerably. Additionally, multiple MLMs having different inputs sizes may be deployed for processing of the selected portions. This reduces the amount of processing involved in rescaling and, for many frames, may completely eliminate the need for rescaling.

More specifically, a given frame may be compared to a different frame (referred to as a reference frame herein), which may be a prior frame obtained by the same camera. A set of motion vectors may be determined for various pixels or blocks of pixels of the given frame. A motion vector characterizes a motion of a particular pixel (or a block of pixels) between the reference frame and the given frame. For example, a block of pixels depicting a portion of a vehicle's hood may move from location A within the reference frame to location B within the given frame over a certain time interval. Clusters of pixels for which a motion vector is determined to be above a certain minimum level (e.g., above noise level) may then be identified together with a region that encloses all such clusters. The size of the region may then be compared to available detector MLM input sizes. If the size of the region is less than the smallest detector MLM input size, the region may be expanded (without rescaling) so that the size of the expanded region matches the input size of the smallest detector MLM. The expanded region is then input into the corresponding detector MLM. If the size of the region is between two detector MLM input sizes, the region may similarly be expanded up to the larger input size. If the size of the region is larger than the largest detector MLM input size, the region may be downscaled to the largest detector MLM input size. The above procedure minimizes the need for rescaling. In some embodiments, the region can undergo additional (up- or down-) scaling to a larger or smaller input size, as described in more detail below.

As described, selection of the regions of interest is performed dynamically and individually for each new frame, together with the selection of an optimal detector MLM. When the selected region of interest is processed by the selected detector MLM that segments the region into separate sub-regions enclosing different moving objects found inside the region, e.g., different vehicles. The outputs of multiple detector MLMs may then be combined for concurrent processing by one or more classifier MLMs that are trained to determine or identify a type/make/model/etc. of the detected objects. As a result, frames from different video streams are processed together resulting in the increased throughput.

The advantages of the disclosed techniques include but are not limited to increased power and processing efficiency that results from elimination or reduction of rescaling operations, focused processing of the actual regions of interest, and concurrent classification of data originating from different sources (e.g., video cameras). The freed processing resources may be used for deployment, on the same computational platforms, of more advanced MLMs (e.g., MLMs having more processing layers) that are capable of more complete object detection and more accurate classification of the detected objects.

System Architecture

FIG. 1A is a block diagram of an example computer system 100 that uses machine learning for efficient motion vector-based detection and classification of moving objects, in accordance with at least some embodiments. As depicted in FIG. 1A, a computing system 100 may include a computing device 102, an image repository 150, and a training server 160 connected to a network 140. Network 140 may be a public network (e.g., the Internet), a private network (e.g., a local area network (LAN), or wide area network (WAN)), a wireless network, a personal area network (PAN), or a combination thereof.

Computing device 102 may be a desktop computer, a laptop computer, a smartphone, a tablet computer, a server, or any suitable computing device capable of performing the techniques described herein. Computing device 102 may be configured to receive an image (frame) 101, which may be a part of a stream of images, e.g., a video feed generated by one or more cameras connected to the computing device 102 over any suitable wired or wireless connection. In some embodiments, the video feed can be generated in real time. In some embodiments, the video feed may be generated at some time in the past, stored, and then retrieved for processing as described in this disclosure. For example, devices capable of generating video feeds (including image 101) can be surveillance cameras, video recorders, photographic equipment, scanners, autonomous vehicle sensing devices (e.g., lidars, radars, long- and mid-range cameras), and the like. Image 101 may be an indoor image, an outdoor image, an image of an automotive environment, an image of a person or a group of people, an image of a natural or artificial (e.g., outdoor or indoor) scenery, or any other type of image. Image 101 may be in any digital (e.g., pixel-based or vector-based) format, including but not limited to JPEG, GIF, PNG, BMP, TIFF, CIB, DEMAP, NITF, and so on. Image 101 may be stored (e.g., together with other images) in image repository 150. Additionally, image repository 150 may store training images 151 for training one or more MLMs object detection and classification, according to some embodiments disclosed herein. Image repository 150 may be accessed by computing device 102 directly or (as shown) via network 140.

Image repository 150 may be a persistent storage capable of storing images as well as metadata for the stored images. Image repository 150 may be hosted by one or more storage devices, such as main memory, magnetic or optical storage based disks, tapes or hard drives, NAS, SAN, and so forth. Although depicted as separate from computing device 102, in at least one embodiment image repository 150 may be a part of computing device 102. In at least some embodiments, image repository 150 may be a network-attached file server, while in other embodiments image repository 150 may be some other type of persistent storage such as an object-oriented database, a relational database, and so forth, that may be hosted by a server machine or one or more different machines coupled to the computing device 102 via network 140.

Computing device 102 may include a memory 104 communicatively coupled with one or more processing devices, such as one or more graphics processing units (GPU) 110 and one or more central processing units (CPU) 130. Memory 104 may store one or more processing modules and MLMs, such as motion vector (MV)-based segmentation 120, object detection models (ODMS) 124, and object classification models (OCM) 126. Computing device 102 may host an inferencing engine 122 to run motion vector-based segmentation 120, ODM(s) 124 and OCM(s) 126. Inferencing engine 122 may be executed by GPU 110 and/or CPU 130. Computing device 102 may use image 101 (or training image 151) as input for MV-based segmentation 120 configured to identify motion vectors in image 101 based on a comparison of image 101 with a reference image, as described in more detail below. Using the motion vectors, computing device 102 may identify a portion of image 101 that depicts one or more moving objects and may select a suitable trained ODM 124 based on the size of the identified portion. Inferencing engine 122 may then apply the selected ODM 124 to the portion of image 101 to identify depictions of individual moving objects in image 101. Multiple ODMS 124 may operate in parallel, each on a particular image (e.g., in the image pipeline) selected for processing using the corresponding ODM 124. The outputs of various ODMS 124 may be combined into a single input into one or more OCMs 126 that may determine the type and other characteristics of the objects, e.g., make, model, year, color, etc. In at least one embodiment, one or more of ODM(s) 124 and/or OCM(s) 126 may be a model that includes a neural network.

ODM(s) 124 and/or OCM(s) 126 may be trained by a training server 160. In at least one embodiment, training server 160 may be a part of computing device 102. In other embodiments, training server 160 may be communicatively coupled to computing device 102 directly or via network 140. Training server 160 may be (and/or include) a rack-mount server, a router computer, a personal computer, a laptop computer, a tablet computer, a desktop computer, a media center, or any combination thereof. Training server 160 may include a training engine 162. In at least one embodiment, training engine 162 may generate one or more machine learning models (e.g., ODM(s) 124 and/or OCM(s) 126). The generated MLMs may be trained by training engine 162 using training data that may include training input(s) 165 and corresponding target output(s) 167. In at least one embodiment, different MLMs may be trained separately for different types of images. For example, an OCM that determines a make of a truck may be trained separately from an OCM that determines a make of a passenger vehicle.

For training of ODM(s) 124, training input(s) 165 may include one or more training images 151 and various metadata for the training images 151. Training images 151 may be large-scale images, such as panoramic images of an automotive environment, which may include multiple objects of very different types, e.g., cars, trucks, buses, motorcycles, bicycles, pedestrians, and the like. A region-of-interest (ROI) annotation engine 163 may annotate large-scale images with indications (e.g., bounding boxes or other bounding shapes such as ellipsoids, cylindrical shapes, etc.) of various ROIs that include individual objects, e.g., a bounding box for a car, a bounding box for a bus, and the like. ROI annotation engine 163 may generate target output(s) 167, which may be training input(s) 165 with ROI annotations. Additionally, training engine 162 may generate mapping data 166 (e.g., metadata) that associates training input(s) 165 with correct target output(s) 167. During training of ODM(s) 124, training engine 162 may identify patterns in training input(s) 165 based on desired target output(s) 167 and train ODM(s) 124 to perform ROI segmentation using the identified patterns. Predictive utility of the identified patterns may be subsequently verified using additional training input/target output associations and then used, during inference stage, by ODM(s) 124, in future processing of new images. For example, upon receiving a new image of an intersection, trained ODM(s) 124 may identify various ROIs that includes various vehicles, pedestrians, and other objects that are located at or near the intersection.

Similarly, for training one or more OCMs 126, a class annotation engine 164 may annotate images of individual ROIs with indications (e.g., pointers, bounding boxes, etc.) of various target objects (cars, trucks, buses, pedestrians, etc.) within ROIs and generate respective classes of ROIs. A class should be understood as any characteristics of an object capable of being ascertained based on the object's appearance, e.g., a type of a vehicle (car, truck, etc.) or animal (e.g., bird, cat, dog, etc.), a manufacturer (or make) of a vehicle, a model/year/color of a vehicle, a breed of an animal, and so on. In at least one embodiment, training input(s) 165 may be generated from large-scale images by taking subsets thereof that correspond to different ROIs. Training engine 162 may also generate mapping data 166 that associates class training input(s) with correct class target output(s) 167. During training of one or more OCMs 126, patterns in class training input(s) 165 can be identified based on desired class target output(s) 167 and used to perform object classification within the respective ROI using identified class-level patterns. The identified patterns may be verified subsequently using additional training (testing) input/target output associations. Based on the identified/verified patterns, trained OCMs 126 then process new images during the inference stage. For example, upon receiving a new image 101, identifying a portion of image 101 that depicts objects, performing ROI detection with ODM(s) 124, the trained OCM(s) 126 may be deployed to classify various objects within image 101.

In at least one embodiment, each or some of ODM(s) 124 and/or OCM(s) 126 may be implemented as deep learning neural networks having multiple levels of linear or non-linear operations. For example, each or some of ODM(s) 124 and/or OCM(s) 126 may be convolutional neural networks, recurrent neural networks (RNN), fully connected neural networks, and so on. In at least one embodiment, each or some of ODM(s) 124 and/or OCM(s) 126 may include multiple neurons wherein each neuron may receive its input from other neurons or from an external source and may produce an output by applying an activation function to the sum of (trainable) weighted inputs and a bias value. In at least one embodiment, each or some of ODM(s) 124 and/or OCM(s) 126 may include multiple neurons arranged in layers, including an input layer, one or more hidden layers, and an output layer. Neurons from adjacent layers may be connected by weighted edges. Initially, edge weights may be assigned some starting (e.g., random) values. For every training input 165, training engine 162 may cause each or some of ODM(s) 124 and/or OCM(s) 126 to generate output(s). Training engine 137 may then compare observed output(s) with the desired target output(s) 167. The resulting error or mismatch, e.g., the difference between the desired target output(s) 167 and the actual output(s) of the neural networks, may be back-propagated through the respective neural networks, and the weights in the neural networks may be adjusted to make the actual outputs closer to the target outputs. This adjustment may be repeated until the output error for a given training input 165 satisfies a predetermined condition (e.g., falls below a predetermined value). Subsequently, a different training input 165 may be selected, a new output generated, and a new series of adjustments implemented, until the respective neural networks are trained to an acceptable degree of accuracy.

Figure 1B:
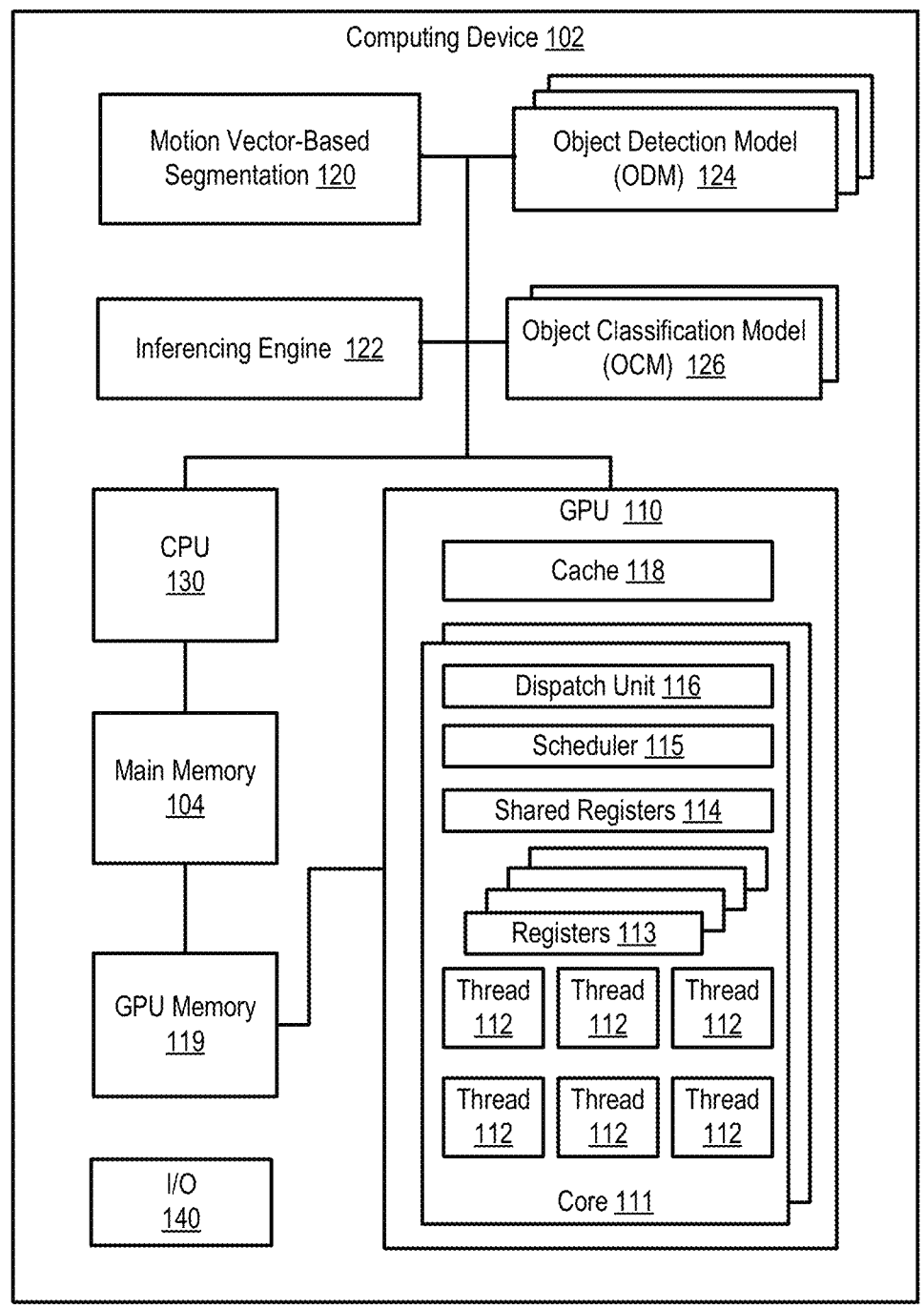
FIG. 1B is an example computing device which may support efficient motion vector-based detection and classification of moving objects, according to at least one embodiment.

FIG. 1B is an example computing device 102 which may support efficient motion vector-based detection and classification of moving objects, according to at least one embodiment. In at least one embodiment, MV-based segmentation 120 and inferencing engine 122 may be executed by one or more GPUs 110 and may use ODM(s) 124 and/or OCM(s) 126 to perform object detection and classification. In at least one embodiment, a GPU 110 includes multiple cores 111, each core being capable of executing multiple threads 112. Each core may run multiple threads 112 concurrently (e.g., in parallel). In at least one embodiment, threads 112 may have access to registers 113. Registers 113 may be thread-specific registers with access to a register restricted to a respective thread. Additionally, shared registers 114 may be accessed by all threads of the core. In at least one embodiment, each core 111 may include a scheduler 115 to distribute computational tasks and processes among different threads 112 of core 111. A dispatch unit 116 may implement scheduled tasks on appropriate threads using correct private registers 113 and shared registers 114. Computing device 102 may include input/output component(s) 134 to facilitate exchange of information with one or more users or developers.

In at least one embodiment, GPU 110 may have a (high-speed) cache 118, access to which may be shared by multiple cores 111. Furthermore, computing device 102 may include a GPU memory 119 where GPU 110 may store intermediate and/or final results (outputs) of various computations performed by GPU 110. After completion of a particular task, GPU 110 (or CPU 130) may move the output to (main) memory 104. In at least one embodiment, CPU 130 may execute processes that involve serial computational tasks (assigned by inferencing engine 122) whereas GPU 110 may execute tasks (such as multiplication of inputs of a neural node by weights and adding biases) that are amenable to parallel processing. In at least one embodiment, Inferencing engine 122 may determine which processes are to be executed on GPU 110 and which processes are to be executed on CPU 130. In other embodiments, CPU 130 may determine which processes are to be executed on GPU 110 and which processes are to be executed on CPU 130.

Figure 2:
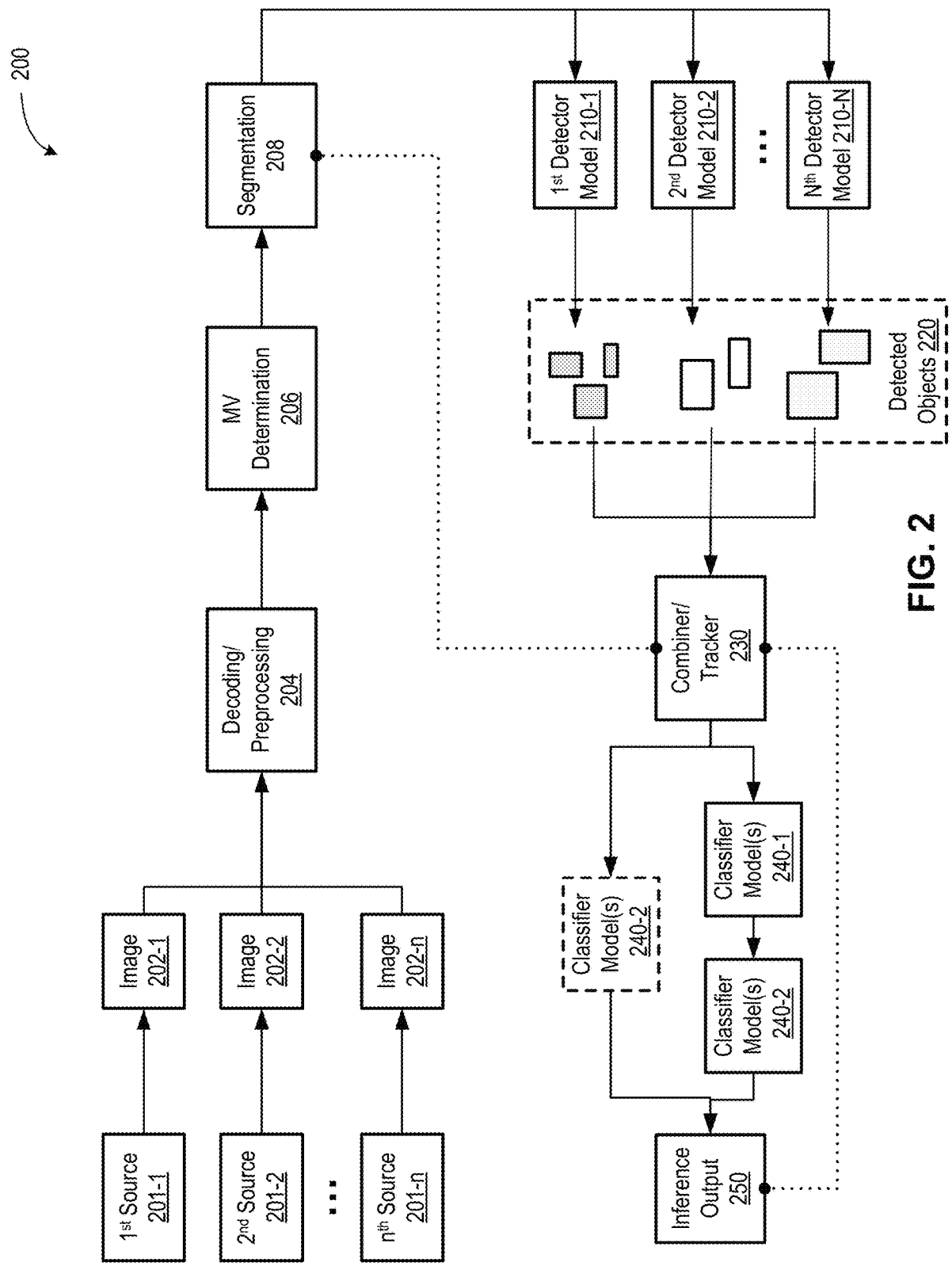
FIG. 2 illustrates an example data flow during detection and classification of moving objects that uses motion vectors and machine learning models of multiple input sizes, according to at least one embodiment.

FIG. 2 illustrates an example data flow 200 during detection and classification of moving objects that uses motion vectors and machine learning models of multiple input sizes, according to at least one embodiment. In at least one embodiment, data flow 200 may be implemented by inferencing engine 122 of computing device 102 of FIG. 1A and FIG. 1B. As illustrated in FIG. 2, data may originate from multiple sources 201-$k$ (n sources depicted), which may be any video or photographic cameras, storages of previously acquired video/photographic images, synthetic video sources (e.g., video gaming applications) or any other suitable sources of imaging data. Each source 201-$k$ may generate a stream of images 202-$k$ (only one image from each stream is depicted, for conciseness). Images 202-$k$ may have a different vantage point, field of view, resolution, frame rate, aspect ratio, and the like. For example, source 201-1 may generate images 202-1 that have a size of 720×486 pixels, source 201-2 may generate images 202-2 that have a size of 1920×1080 pixels, source 201-3 may generate images 202-2 that have a size of 1280×720 pixels, and the like. In at least one embodiment, images 202-$k$ may undergo decoding/preprocessing 204, which may include trimming, image sharpening, blur/noise/artifact removal, compression, resampling, normalizing, upsampling, etc., or any combination of such operations.

Figure 3:
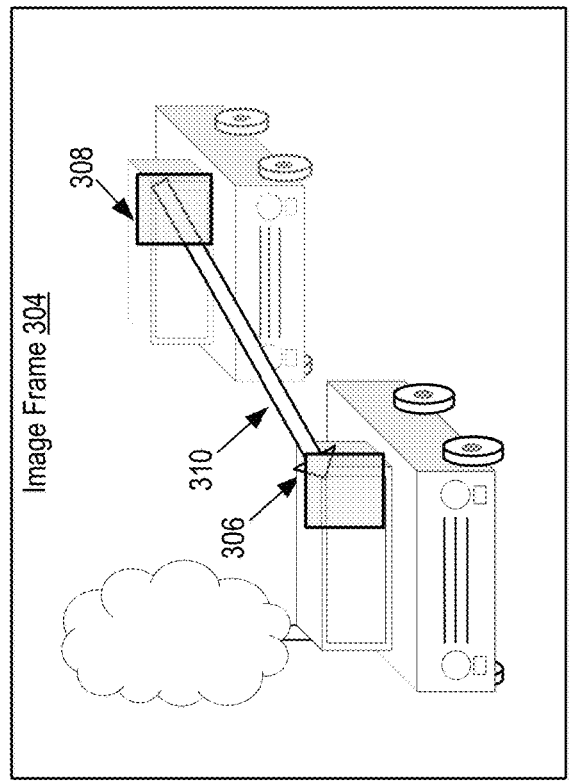
FIG. 3 depicts schematically a use of motion vectors to identify moving regions of interest, according to at least one embodiment.
Figure 3:
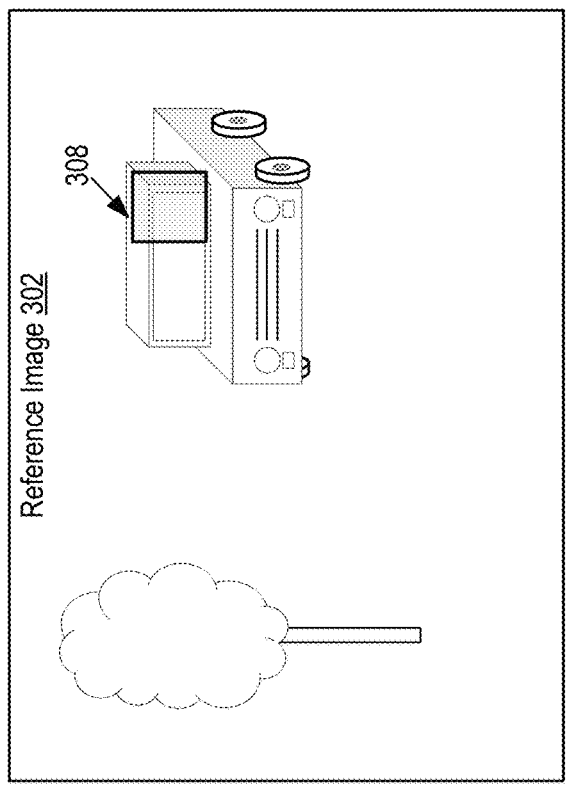

Images 202-$k$ output by decoding/preprocessing 204 may be input into motion vector (MV) determination module 206. MV determination module 206 may identify how pixels of a given image are displaced relative to the reference image. FIG. 3 depicts schematically a use of motion vectors to identify moving regions of interest, according to at least one embodiment. Reference image 302 is used to identify pixel displacement in image 304. Image 304 may be taken at time t while reference image 302 may be taken at some previous time t−τ (although, in some embodiments, reference image 302 may be taken at a later time t+τ). MV determination module 206 may identify a pixel or a block of pixels, e.g., block 306, in image 304 and may further identify a pixel or a block of pixels, e.g., block 308, in reference image 302, that images the same region of a moving object, e.g., a vehicle. For example, MV determination module 206 may identify that pixel intensity (or multiple pixel intensities, if the images are color images) I(x, y) of block 306 in image 304 are the same (within a certain tolerance) as pixel intensity $I_{REF}$(x−Δx, y−Δy) of block 308 in reference image 302, I(x, y)≈$I_{REF}$(x−Δx, y−Δy), and may thus depict the same object or a portion of the same object.

In various instances, pixel intensity in the two images may not be exactly the same since the brightness (and color) of pixels may change when the moving object changes its position relative to the camera. As a result, various error evaluations procedures may be deployed. For example, the difference $\delta I(x_i, y_k)=I(x_i, y)-I_{REF}(x_i-\Delta x, y_k-\Delta y)$ may be formed for each pixel $x_i$, $y_k$ of a block that is being hypothesized to belong to a moving object, and a quadratic cost function (or any other suitable loss function) may be computed, e.g., Cost=$\Sigma_j \Sigma_k [\delta I(x_i, y_k)]^2$. If the cost function is within a certain (e.g., empirically determined) margin mar relative to the total (or average) pixel intensity of the block, I=$\Sigma_j \Sigma_k I(x_i, y_k)$, e.g., such that Cost/I≤mar, block 306 in image 304 and block 308 in reference image 302 may be identified as belonging to depictions of the same object. The values Δx and Δy that characterize the displacement of the blocks between the two images represent components of a motion vector 310 (exaggerated in FIG. 3) for block 306, e.g. ΔR=(Δx, Δy). Determination of both the motion vector ΔR as well as the size of the block 306 may itself be performed as part of the optimization procedure, e.g. by minimizing the cost function for various blocks that are identified as depictions of the same object(s). In some embodiments, the cost function may be a binary cross-entropy cost function, mean squared error cost function, mean squared error cost function, weighted mean square error cost function, mean absolute error cost function, Huber cost function, Hinge cost function, multi-class cross entropy cost function, Kullback-Liebler cost function, and the like.

In some embodiments, to reduce the amount of processing performed in identifying motion vectors, MV determination module 206 may limit candidate blocks 308 in reference image 302 to a certain vicinity of block 306 in image 304. The size of the vicinity may be determined by the time difference τ between reference image 302 and image 304 and by a maximum expected speed $v_{max}$ of moving objects in a particular environment, |ΔR|=$v_{max}$τ. For example, the maximum speed may be 20 mph in a parking garage, 40-50 mph at a city intersection, and so on. Blocks 306 and 308 may be of any suitable pixel size, e.g., 32×32 pixels, 8×16 pixels, 4×4 pixels, 2×3 pixels, or, in some instances, may be as small as a single pixel.

Figure 4A:
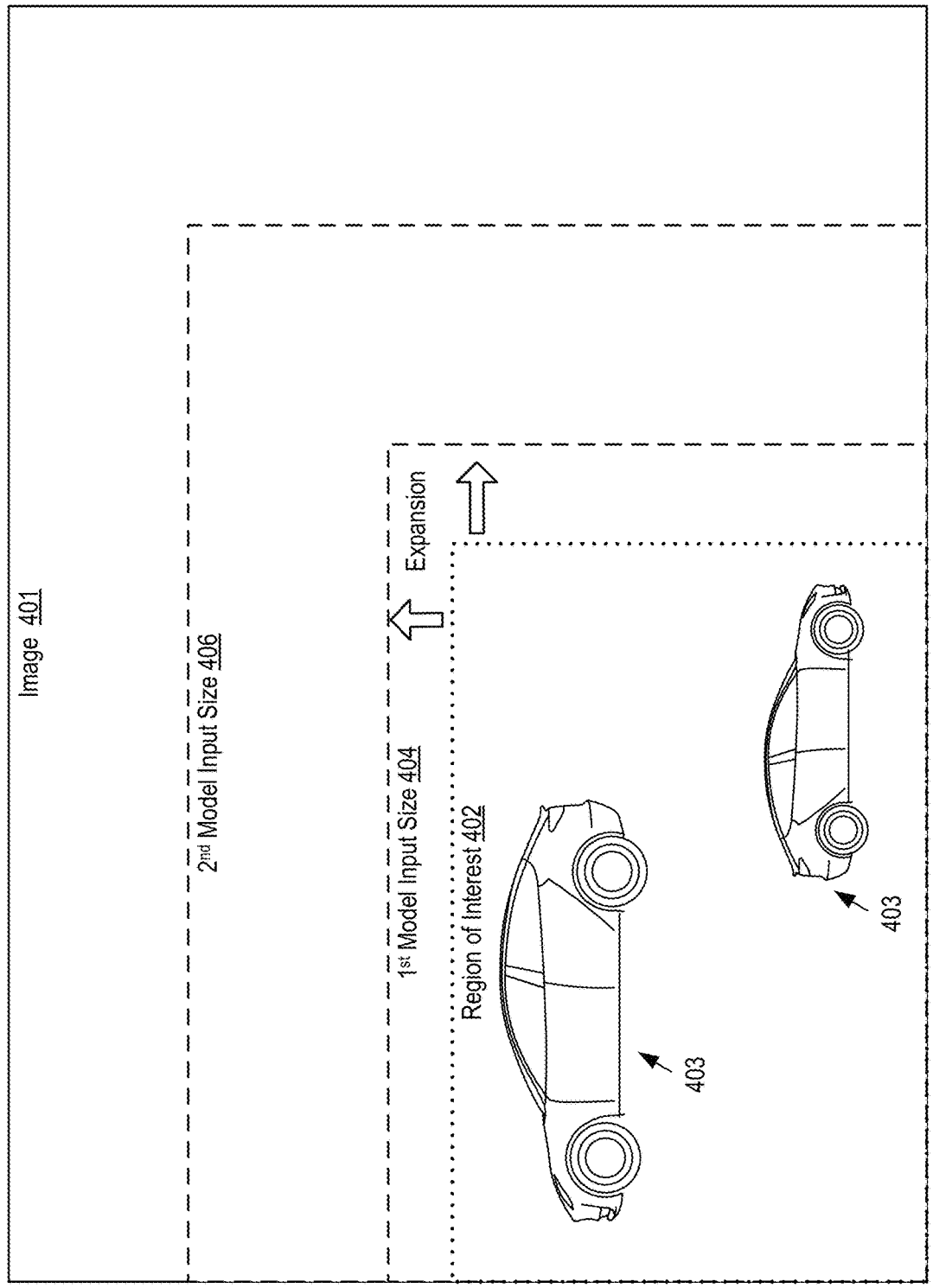
FIGS. 4A-C illustrate selection of a detection model based on motion vectors, according to at least one embodiment.
Figure 4B:
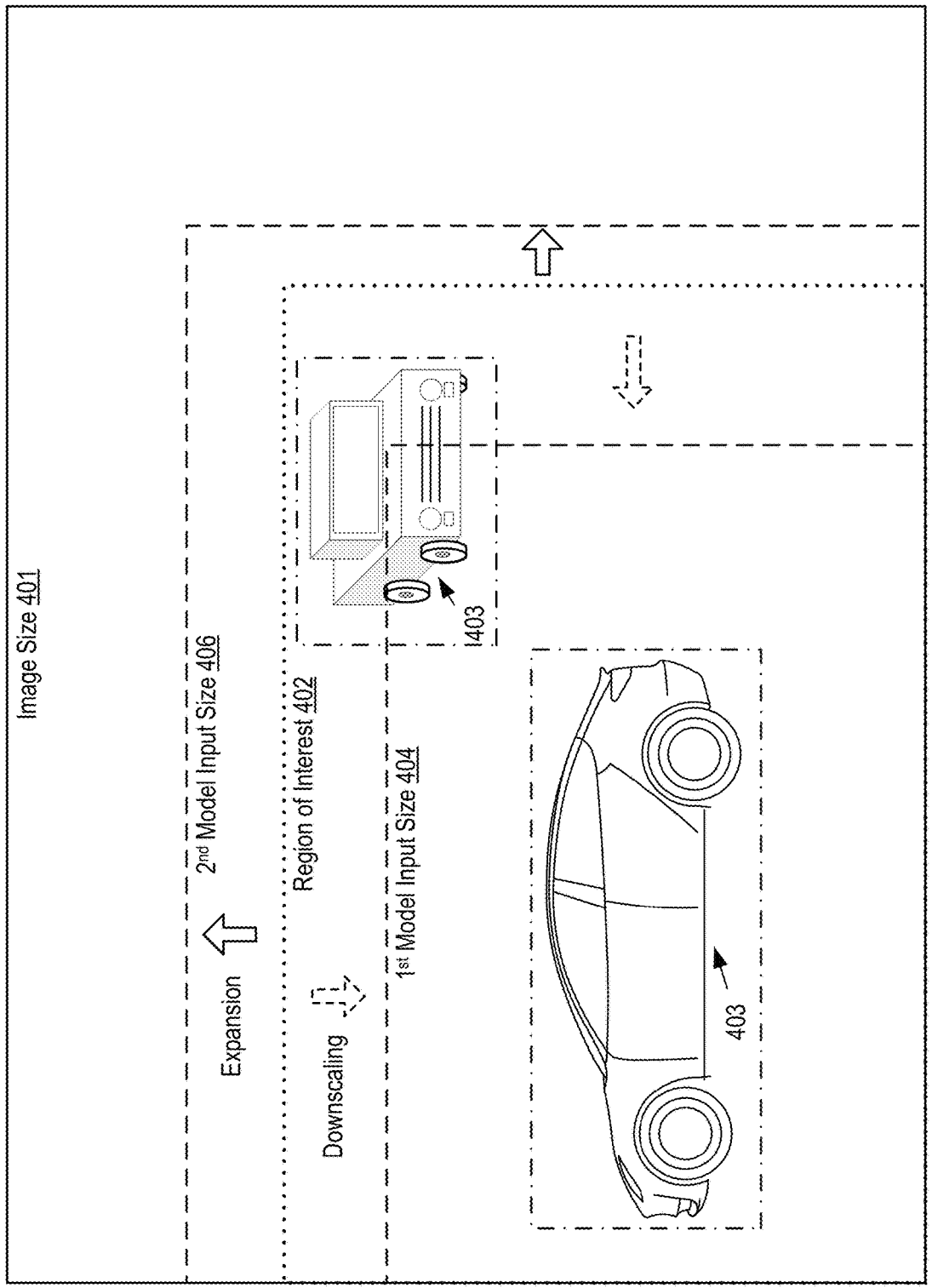
Figure 4C:
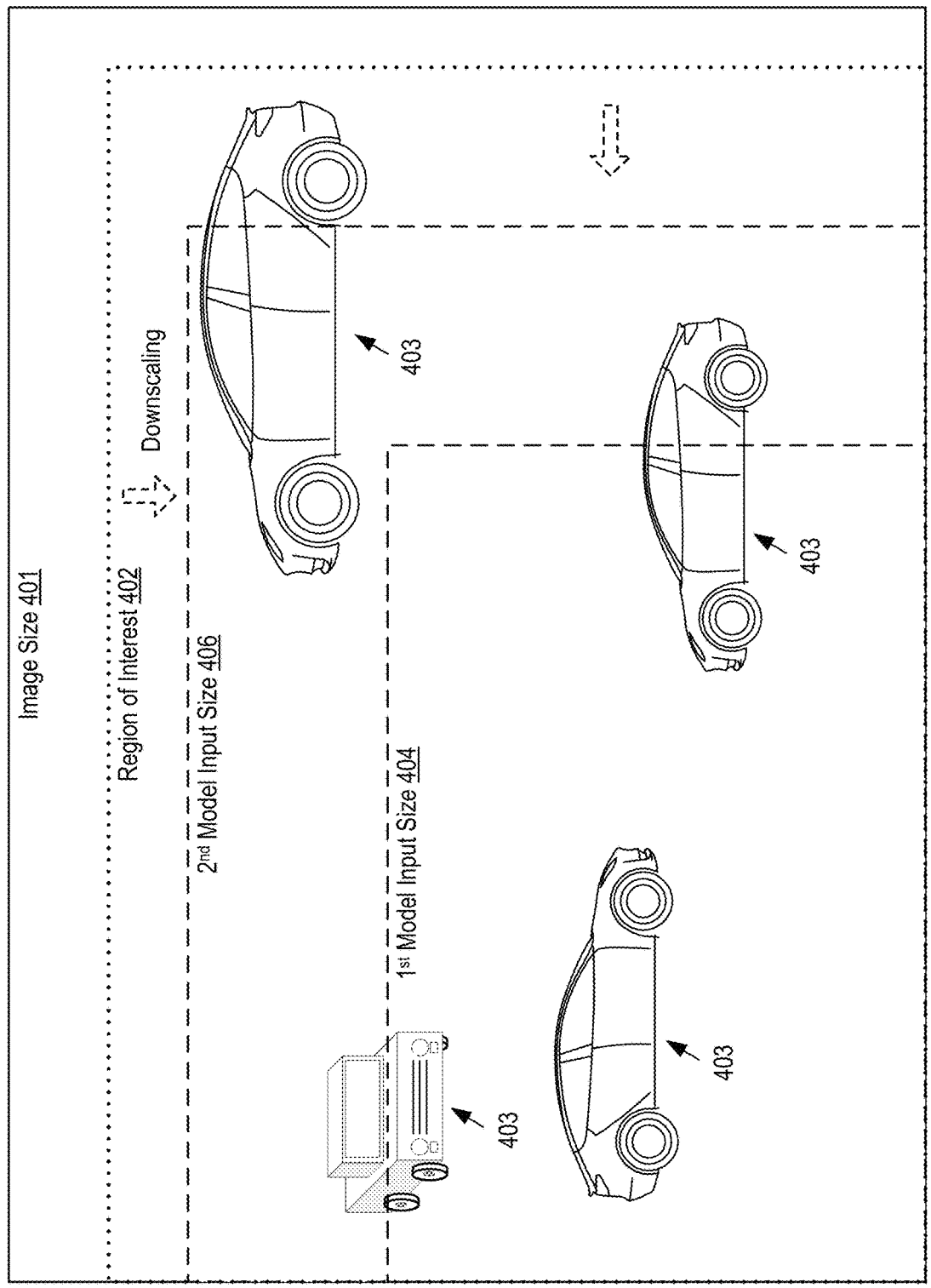

With a continuing reference to FIG. 2, a set of motion vectors identified for a given image, e.g., image 202-1, may be used by a segmentation module 208 to select a detection model 210-$k$ for processing of the image. Detection models 210-$k$ may be ODM(s) 126 of FIG. 1A. FIGS. 4A-C illustrate selection of a detection model based on motion vectors, according to at least one embodiment. Segmentation module 208 may access the set of motion vectors {ΔR} and select pixels (or blocks of pixels) associated with motion vectors OR that are greater than a value corresponding to noise. Such pixels (or blocks of pixels) are hypothesized to belong to depictions of moving objects. Segmentation module 208 may then identify a region of interest 402 (depicted with the dotted line in FIG. 4A) that encloses some or all such pixels (or blocks of pixels). In some embodiments, the region of interest may be the minimum bounding box for such pixels, e.g., the bounding box whose bottom left corner has coordinates ($x_{min}$, $x_{min}$) and top right corner has coordinates ($x_{max}$, $y_{max}$), where $x_{min}$ ($x_{max}$) is the smallest (largest) x-coordinate of pixels associated with a depiction of any moving object and $y_{min}$ ($y_{max}$) is similarly the smallest (largest) y-coordinate of such pixels. Although, for convenience of viewing, the region of interest 402 is depicted in FIG. 4A (and FIGS. 4B-C) as occupying the bottom left corner of image 401, the region of interest 402 may be located anywhere within image 401.

Multiple available detector models 210-$k$ (e.g., ODM(s) 126) may have different input sizes, $m_k \times n_k$. Selection of a detector mode 210-$k$ may be performed by comparing various available input sizes $m_k \times n_k$ to the size of the region of interest 402, e.g., ($x_{max}$-$x_{min}$)×($y_{max}$-$y_{min}$). FIG. 4A illustrates a situation where the size of the region of interest 402 is less than the smallest detection model input size, e.g., than the first model input size 404, $m_1 \times n_1$. In such instances, the size of the region of interest may be expanded to $m_1 \times n_1$, e.g., by adding pixels depicting non-moving objects to one or more sides of the region of interest 402, as indicated with the solid arrows in FIG. 4A. In some embodiments, the added pixels may be pixels of the same image 202-1 or synthetic, e.g., padding, pixels having some fixed intensity. FIG. 4B illustrates a situation where the size of the region of interest 402 is between two detection model input sizes, e.g., between the first model input size 404, $m_1 \times n_1$, and a second model input size 406, $m_2 \times n_2$. In such instances, the size of the region of interest may be increased to $m_2 \times n_2$, e.g., in the same fashion as described above in conjunction with FIG. 1B. FIG. 4C illustrates a situation where the size of the region of interest 402 is above the maximum detection model input size, e.g., above second model input size 406, $m_2 \times n_2$ (if two detector models 210-$k$ are deployed). In such instances, the region of interest 402 may be downscaled to the maximum model input size, as indicated with the dashed arrows in FIG. 4C.

FIGS. 4A-C are intended as illustrations of the embodiment in which regions of interest are expanded to the next lowest detector model input size, to reduce the need for rescaling as much as possible. In some embodiments, a set of threshold sizes may be defined that are between the available model input sizes. For example, a threshold size $m_T \times n_T$ may be defined between the first model input size $m_1 \times n_1$ and the second model input size $m_2 \times n_2$, such that if the size of the region of interest 402 is between $m_1 \times n_1$ and $m_T \times n_T$, the region of interest is scaled down to $m_1 \times n_1$ (as depicted with dashed arrows in FIG. 4B) and if the size of the region of interest 402 is between $m_T \times n_T$ and $m_2 \times n_2$ the region of interest is expanded (or padded) to $m_2 \times n_2$. The threshold size $m_T \times n_T$ may be selected based on overall computational efficiency. For example, where the size of the region of interest below $m_T \times n_T$, it may be computationally more efficient to downscale the region of interest 402 to $m_1 \times n_1$ and process the downscaled image using the smaller input size model rather than to expand the region of interest 402 and process the expanded image using the larger input size model (which may result in a larger processing time). For the regions of interest 402 that are above $m_T \times n_T$ in size, it may be more efficient to perform expansion rather than downscaling. Additionally, the larger input size model may be more accurate. Accordingly, determination of threshold size(s) $m_T \times n_T$ may account for all such metrics and may be performed in view of application-specific criteria, including user-specified criteria.

Any number of thresholds $m_T \times n_T$ may be identified. In some embodiments, the number of different thresholds may be N−1 for a system of N detector models of different input sizes. In some instances, it may happen that a horizontal m (or vertical n) size of the region of interest 402 is larger than the horizontal $m_k$ (or vertical $n_k$) input size of a particular detector model 210-$k$ but a vertical n (or horizontal m) size of the region of interest 402 is smaller than the vertical $n_k$ (or horizontal $m_k$) size of the same detector model 210-$k$. A number of ways to handle such situations may exist. For example, the size of the region of interest may be expanded to the next largest input size model, e.g., of detector model 210-(k+1), if even one dimension of the region of interest 402 is above the corresponding dimension of detector model 210-$k$. In some instances, the region of interest 402 may be expanded (or padded) along the smaller dimension, e.g., n→ñ such that the new size m×ñ has the same aspect ratio (m:ñ) as the input size of detector model 210-$k$ ($m_k$:$n_k$). The expanded (padded) region of interest may then be downscaled to the input size of detector model 210-$k$. In some embodiments, the region of interest 402 may be downscaled (or upscaled) differently along different dimensions (so that resizing or padding need not be performed). Since such anisotropic rescaling changes relative horizontal and/or vertical dimensions of various objects, this technique may be used in the instances where detector model 210-$k$ has been trained on a variety of images, including those that depict objects whose dimensions have been modified (e.g., stretched or squeezed) compared to the natural dimensions of such objects.

Referring back to FIG. 2, a selected (and, in some instances, rescaled) region of interest may be directed by segmentation module 208 for processing by one of the detector models 210-$k$. For example, each detector model 210-$k$ may be assigned, for processing, a corresponding batch of entries (regions of interest) that are fed into that model. More specifically, a new entry may be placed at the back end of the respective batch with entries retrieved from the batch for processing by detector model 210-$k$ in the historical order of placement. In some embodiments, entries in a batch may include actual pixel values stored in an input buffer. In some embodiments, entries in a batch may be metadata identifying the regions of interest 402 is the respective full images. For example, the metadata may include an identifier of the image, the coordinates of the bounding box for the region of interest 402, time when the image was taken, and so on. In some embodiments, processing of entries in the batch may be performed in a pipelined manner. More specifically, if detector model 210-$k$ is a neural network model, a first layer of neurons of detector model 210-$k$ may be performing computations of the first entry in the batch during a first computational cycle (or a set of cycles) and may be performing computations of the second entry during the second computational cycle, and so on. In the meantime, during the second computational cycle, the second layer of neurons may be processing the first entry, and so on. In some embodiments, processing by each detector model 210-$k$ may be performed by separate processing threads (e.g., in parallel) by one or more GPUs.

Each of the detector models 210-1 . . . 210-N may output indications of detected objects 220 in the respective entries. The indication may have any suitable form, e.g., sets of coordinates, bounding boxes, and the like. The bounding boxes may be rectangular, ellipsoidal, or may have any other suitable form. For example, if object A is partially obscuring object B, the indication of object B may include a bounding box that encloses object B with a part of the bounding box removed (e.g., the portion obscured with object A). In some embodiments, indications may include any number of connected (or otherwise associated) boxes or regions of pixels, pixel-by-pixel listings, or the like. There may be any number of detected objects 220 within a particular entry processed by each detector model 210-$k$. In some embodiments, detector models 210-$k$ may identify the sub-regions within the regions of interest 402 that correspond to various moving objects. In some embodiments, detector models 210-$k$ may identify any additional information about the objects, such as a high-level type/class of the object, e.g., a vehicle or a person.

Indications of detected objects 220 may be received by a combiner (tracker) 230. Combiner 230 may create a data structure that includes data (e.g., pixel data) for each sub-region corresponding to the objects detected by all or at least some detector models 210-1 . . . 210-N. More specifically, the data structure created by combiner 230 during j-th computational cycle (or a set of cycles) may include detected objects 220 whose identifications were output by detector models 210-1 . . . 210-N during a previous, e.g., j−1-th computational cycle. For example, the data structure may include a concatenation of pixel values for various sub-regions corresponding to detected objects 220. Additionally, the data structure may include various metadata that identifies each sub-region as being generated by a respective source 201-$k$, location of the sub-region within image 202-$k$, time of taking image 202, physical location, resolution, field-of view of the respective source 201-$k$, and so on. At least some of the metadata may be provided by segmentation module 208 (as indicated by the dotted line in FIG. 2) based on the full image 202-$k$.

The data structure may be provided to one or more classifier models 240-$k$. Classifier models 240-$k$ may include any number of models trained to determine, independently (e.g., in parallel) or sequentially, various properties of the detected objects 220. For example, classifier model 240-1 may determine a type of an object (e.g., sport-utility vehicle, pick-up truck, passenger car, van, bus, semi-track, non-vehicle object, etc.) and classifier model 240-2 may be determine a make and model of the vehicle. In some embodiments, e.g., where different classifier models are operating in parallel, some classifier models (e.g., model 240-1 and model 240-2, as depicted with the dashed block) may be receiving and processing the same data structure provided by combiner 230. In some embodiments, e.g., where different classifier models are operating sequentially, one of the classifier models (e.g., model 240-1) may be outputting a set of features (e.g., feature vectors) representative of the appearance of the object, and another classifier model (e.g., model 240-2) may be processing this set of features to determine a final classification. Although two classifier models 240-$k$ are depicted in FIG. 2, the number of classifier models 240-$k$ need not be limited and may be one, three, or any other number of models. Classifier models 240-$k$ generate an inference output 250, which may include some of all classifications determined by detector models 210-$k$ and classifier models 240-$k$. Inference output 250 may be provided to a user, an application (e.g., surveillance application, traffic control application, etc.), stored in local memory or on cloud, and so on. Inference output 250 may be indexed or supplied with information from combiner 230 to reference the location of the classified objects, an identification of a specific image 202-$k$ (as well as any a reference image) that captured the classified objects, the time when the image was taken, and the like. In some embodiments, one or more classifications (e.g., a high-level object type) may be determined by detector models 210-$k$. In some embodiments, all classifications may be obtained by detector models 210-$k$.

In some embodiments, combiner 230 may manage the computational pipeline of classifier models 240-$k$. For example, under certain conditions, a number of objects in most images may be small (e.g., an off-peak traffic) so that most of the regions of interest are relatively narrow and are thus directed to a low input size detector model (e.g., detector model 210-1). Under other condition (e.g., peak traffic), the number of objects may be large with most of the regions of interest being wide and, correspondingly, directed for processing to a high input size detector model (e.g., detector model 210-N). As a result, combiner 230 may receive more objects detected by some detector models than objects detected by other models. In such instances, combiner 230 may combine objects detected by different detector models only for a portion of all computational cycles. During other cycles, combiner 230 may be clearing the pipeline backlog created by one (or several) detector models. For example, combiner 230 may access an overflow buffer that stores unprocessed objects previously detected by these model(s) and generate a data structure using P previously outputs of these model(s). Combiner 230 may repeat this procedure as many times as needed to clear the backlog before resuming combined processing of different detector models 210-$k$.

Figure 5:
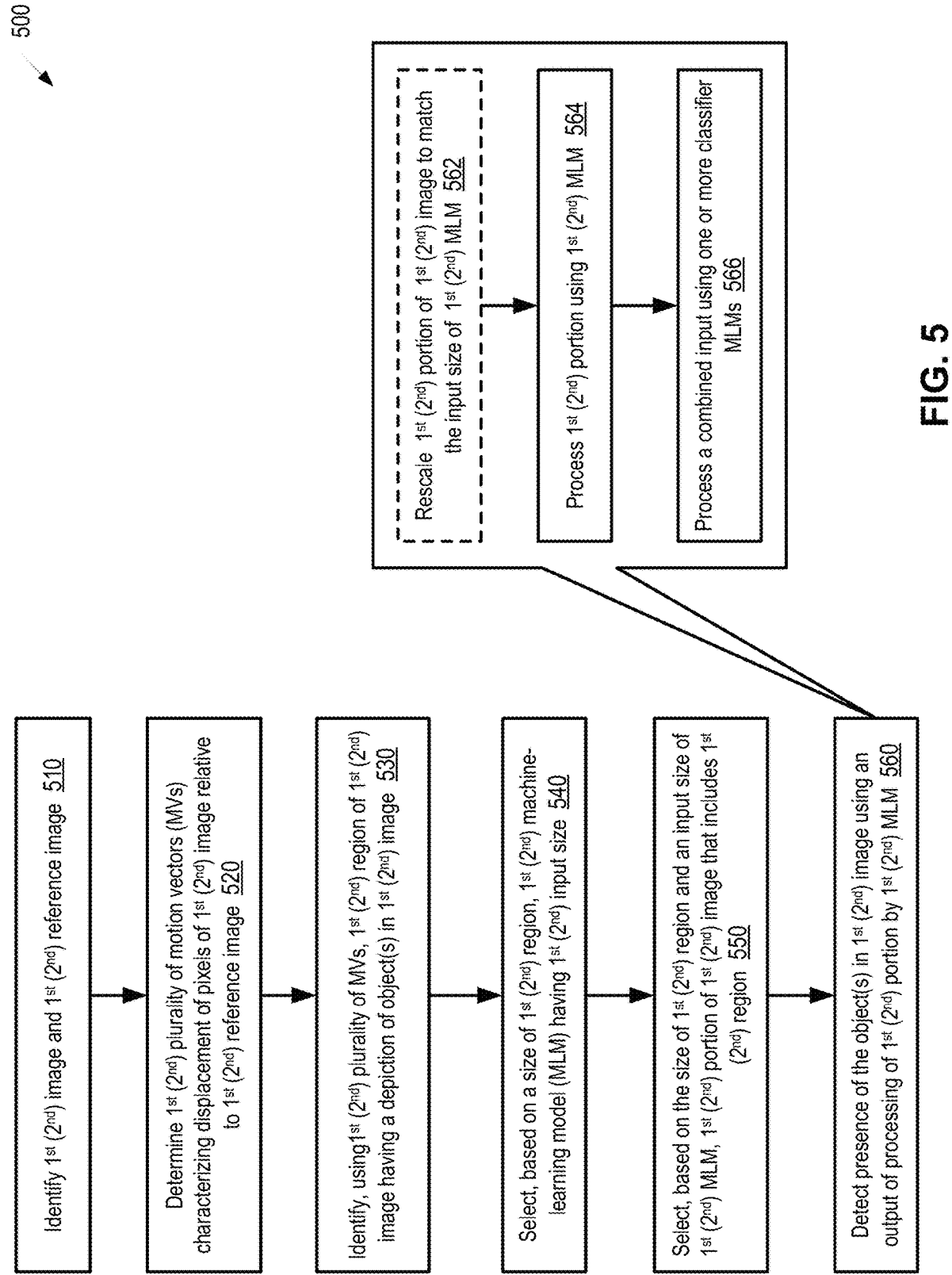
FIG. 5 is a flow diagram of an example method of using motion vectors and machine learning models of multiple input sizes for efficient detection and classification of moving objects, according to at least one embodiment.
Figure 6:
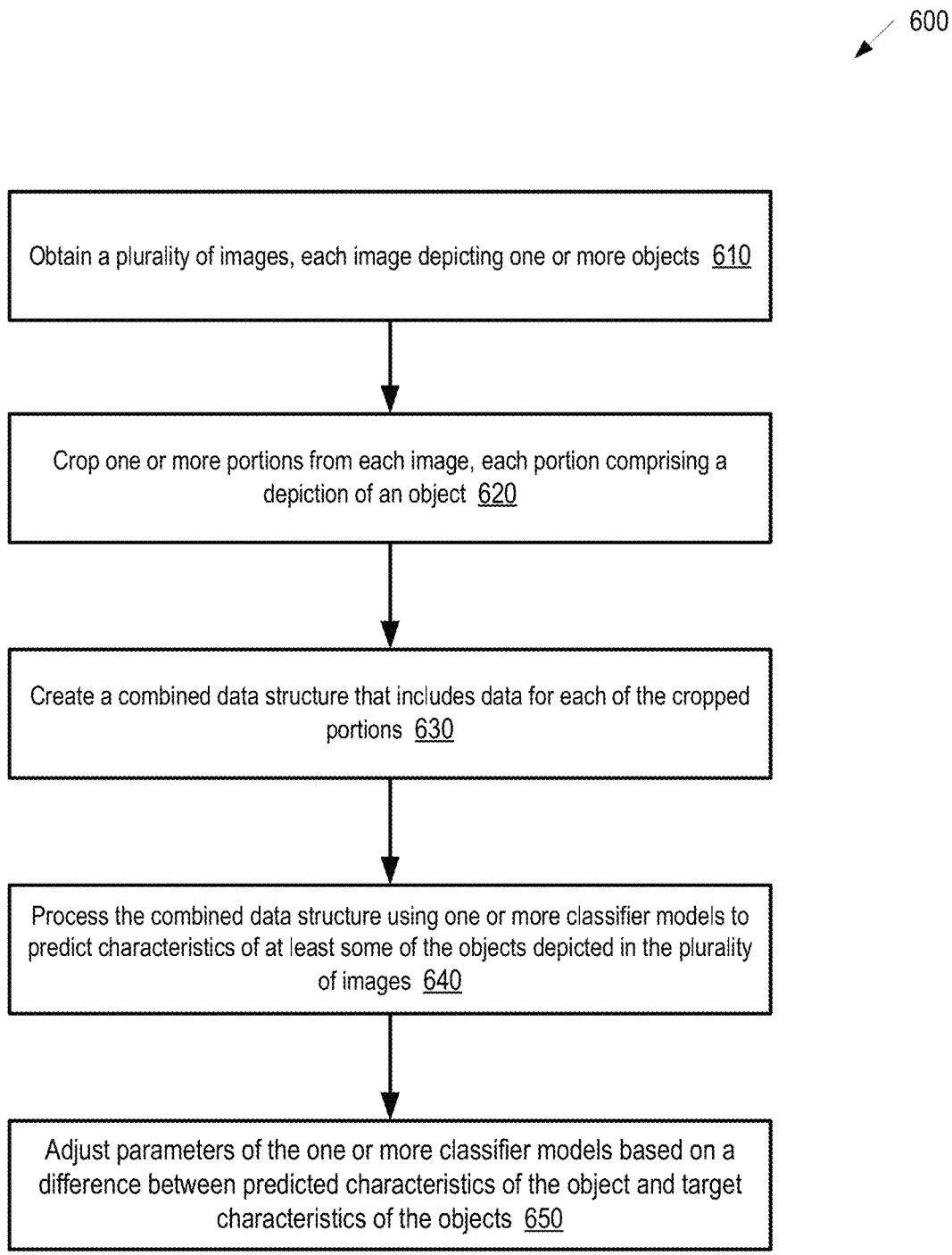
FIG. 6 is a flow diagram of an example method of training one or more classifier machine learning models for efficient detection and classification of moving objects, according to at least one embodiment.

FIG. 5 and FIG. 6 are flow diagrams of respective example methods 500 and 600 that facilitate detection and classification of moving objects in streams of images, according to some embodiments of the present disclosure. Methods 500 and 600 may be performed by one or more processing units (e.g., CPUs and/or GPUs), which may include (or communicate with) one or more memory devices. In at least one embodiment, method 500 and method 600 may be performed by processing units of computing device 102 or training server 160. In at least one embodiment, method 500 and method 600 may be performed by multiple processing threads (e.g., CPU threads and/or GPU threads), each thread executing one or more individual functions, routines, subroutines, or operations of the method. In at least one embodiment, processing threads implementing method 500 (and, similarly, method 600) may be synchronized (e.g., using semaphores, critical sections, and/or other thread synchronization mechanisms). Alternatively, processing threads implementing method 500 (and, similarly, method 600) may be executed asynchronously with respect to each other. Various operations of methods 500 and 600 may be performed in a different order compared with the order shown in FIGS. 5 and 6. Some operations of the methods may be performed concurrently with other operations. In at least one embodiment, one or more operations shown in FIGS. 5 and 6 may not always be performed.

FIG. 5 is a flow diagram of an example method 500 of using motion vectors and machine learning models of multiple input sizes for efficient detection and classification of moving objects, according to at least one embodiment. Method 500 may be performed in the context of traffic control and monitoring, medical imaging, autonomous driving systems, industrial settings, research settings, and many other contexts. At block 510, processing units performing method 500 may identify a first image and a first reference image. Additionally, processing units may identify a second (third, etc.) image and a second (third, etc.) reference image. The terms first, second, etc. should be understood as mere identifiers and do not presuppose any temporal or contextual order. The first (second, etc.) image and the first (second, etc.) reference image may be parts (e.g., frames) of a respective stream of images, e.g., a stream of video frames or photographic images taken at certain time intervals, e.g., regular time intervals. More specifically, the first image and the first reference image may be obtained by a first camera, wherein the second (third, etc.) image and the second (third, etc.) reference image may be obtained by a second (third, etc.) camera. A field of view of the first camera may be different from a field of view of the second (third, etc.) camera.

At block 520, the processing unit may determine a first (second, etc.) plurality of motion vectors for the first (second, etc.) image. Each of the first (second, etc.) plurality of motion vectors may characterize displacement of one or more pixels of the first image (second, etc.) relative to the first (second, etc.) reference image. For example, the first (second, etc.) image may be segmented into a grid of pixel blocks and, for at least some pixel blocks, a similar reference block may be located in the first (second, etc.) reference image. Some of the pixel blocks may be located in the first image at the same (or approximately the same) locations as similar blocks in the first (second, etc.) reference image. Such blocks depict stationary objects (or portions of such objects) and may be associated with zero motion vectors. Depictions of moving objects may be associated with non-zero motion vectors, each motion vector characterizing displacement of a certain pixel or pixel block. To identify such motion vectors, in some embodiments, grids of multiple block sizes may be used, e.g., a grid of 16×16 pixel blocks and a grid of 4×4 pixels blocks. In some embodiments, an initial coarse grid (e.g., grid of 32×32 pixel blocks, 64×64 pixel blocks, etc.) may first be deployed to eliminate regions of the first (second, etc.) image that depict stationary objects and that include pixel blocks that are the same as the corresponding pixel blocks in the first (second, etc.) reference images. Once a mismatch in the one or more pixel blocks of the initial grid is detected, the respective blocks may be further subdivided into finer pixel blocks, e.g., 8×8 pixel blocks, 4×4 pixel blocks, etc. The finer blocks may then be shifted along various directions (e.g., 8, 12, 16, etc., directions) by a certain number of pixels (e.g., an integer or fractional number of pixels) until the best match with the corresponding blocks in first the reference image is found.

At block 530, method 500 may continue with the processing units identifying, using the first (second, etc.) plurality of motion vectors, a first (second, etc.) region of interest of the first (second, etc.) image, the first (second, etc.) region of interest depicting of one or more objects in the first (second, etc.) image. For example, the first (second, etc.) region of interest may be region of interest 402 of FIGS. 4A-C. In some embodiments, the first (second, etc.) region of interest may include pixels or blocks of pixels of the first (second, etc.) image associated with non-zero motion vectors and excluding pixels or blocks of pixels associated with zero motion vectors and thus depicting stationary objects. At block 540, the processing units may use a size of the first (second, etc.) region of interest to select a first (second, etc.) MLM of a plurality of MLMs. Each of the plurality of MLMs may have a different input size. The selection of the MLM may be performed as described in conjunction with FIGS. 4A-C.

At block 550, the processing units may further select, based on the size of the first (second, etc.) region of interest and an input size corresponding to the first MLM, a first (second, etc.) portion of the first (second, etc.) image, wherein the first (second, etc.) portion comprises the first (second, etc.) region of interest. For example, the first (second, etc.) portion may include the region of interest 402 and an additional segment of the first (second, etc.) image, such that the size of the first (second, etc.) portion matches the size of one or the MLMs (e.g., detector models 210-*k*), which may be the MLM with the smallest input size that exceeds (or matches) the size of the region of interest.

At block 560, method 500 may continue with the processing units detecting a presence of the one or more objects in the first (second, etc.) image based on an output of processing of the first (second, etc.) portion using the first (second, etc.) MLM. In some embodiments, block 560 may further include classifying the one or more detected objects. In some embodiments, classifying the moving objects may include a number of operations, illustrated with the callout portion of FIG. 6. More specifically, at optional block 562, prior to processing of the first (second, etc.) portion by the first (second, etc.) MLM, the processing units may rescale the first (second, etc.) portion of the first (second, etc.) image to match the input size corresponding to the first (second, etc.) MLM. In particular, the first (second, etc.) portion of the first (second, etc.) image may be selected to have a size that is different from the input size corresponding to the first (second, etc.) MLM. For example, as illustrated in FIG. 4C, if the size of the region of interest 402 exceeds the input size corresponding to the selected MLM, the region of interest 402 may be downscaled to that input size.

At block 564, method 500 may include processing the first (second, etc.) selected portion of the first (second, etc.) image by the first (second, etc.) MLM. In some embodiments, the output of processing of the first (second, etc.) portion by the first (second, etc.) MLM may include a bounding box for each of the one or more objects in the first (second, etc.) image. In some embodiments, classifying the objects in the first image is performed concurrently with classifying the one or more objects in the second (third, etc.) image. More specifically, as indicated by block 566, classifying the one or more objects may include processing a combined input by one or more classifier MLMs. The combined input may include the output of processing of the first portion by the first MLM and the output of processing of the second portion by the second (third, etc.) MLM.

In some embodiments, the one or more classifier MLMs are trained to determine a type of one or more objects represented in the combined input. The output of the one or more classifier MLMs may comprise one or more inferences corresponding to i) a type of a vehicle, ii) a make of the vehicle, or iii) a model of the vehicle. Such characteristics may be determined for at least one object of the one or more objects in at least one of the first image or the second (third, etc.) image. In some embodiments, the combined input into the one or more classifier MLMs may be one of a plurality of combined inputs of a pipeline of inputs. In such embodiments, the one or more classifier MLMs may be configured to perform pipelined processing of this plurality of combined inputs. In some embodiments, any or all of the processing operations, including processing of the first (second, etc.) portion by the first (second, etc.) MLM, processing of the combined input(s) may be performed using one or more GPUs.

FIG. 6 is a flow diagram of an example method 600 of training one or more classifier machine learning models for efficient detection and classification of objects, according to at least one embodiment. At block 610, processing units performing method 600 may obtain a plurality of training images, each of the plurality of training images depicting one or more objects (e.g., objects in a state of motion). At block 620, method 600 may continue with cropping one or more portions from each of the plurality of images, each portion comprising a depiction of an object. At block 630, method 600 may continue with the processing units creating a combined data structure that includes data for each of the cropped portions. The combined data structure may further comprise various metadata associated with the cropped portions, which may include time when the images were taken, locations of the cameras that generated the images, resolution of the cameras, and the like. At block 640, method 600 may include processing the combined data structure using one or more classifier models to predict characteristics of at least some of the objects depicted in the plurality of images. At block 650, method 600 may include adjusting parameters of the one or more classifier models based on a difference between the predicted characteristics of the object and target characteristics of the objects.

Inference and Training Logic

Figure 7A:
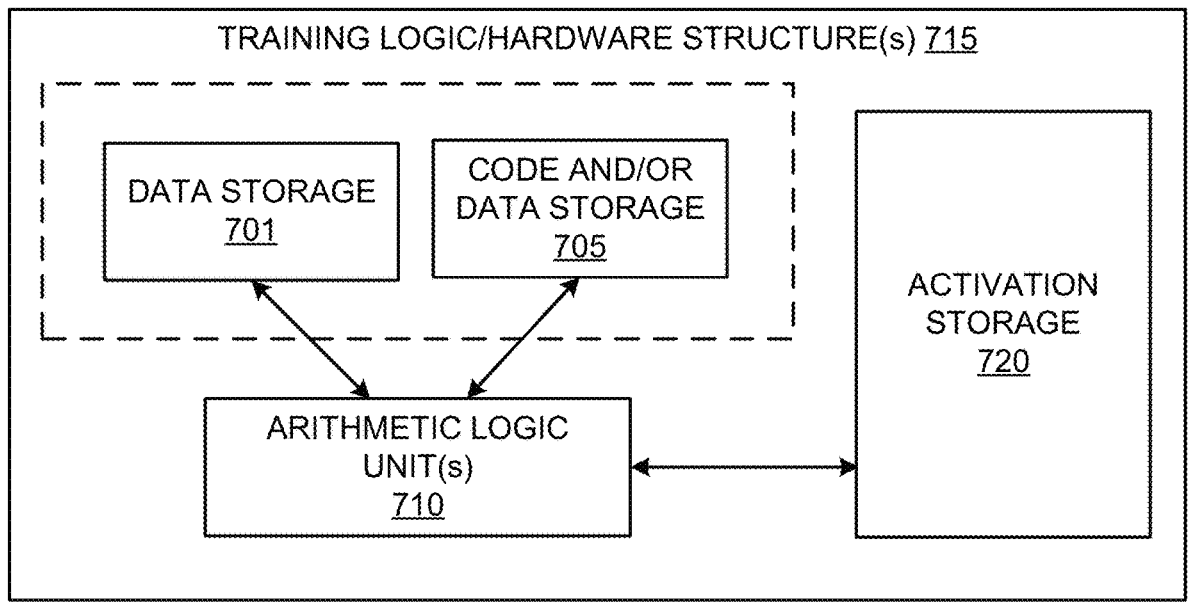
FIG. 7A illustrates inference and/or training logic, according to at least one embodiment.

FIG. 7A illustrates inference and/or training logic 715 used to perform inferencing and/or training operations associated with one or more embodiments.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include, or be coupled to code and/or data storage 701 to store graph code or other software to control timing and/or order, in which weight and/or other parameter information is to be loaded to configure, logic, including integer and/or floating point units (collectively, arithmetic logic units (ALUs) or simply circuits). In at least one embodiment, code, such as graph code, loads weight or other parameter information into processor ALUs based on an architecture of a neural network to which such code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or code and/or data storage 701 may be cache memory, dynamic randomly addressable memory ("DRAM"), static randomly addressable memory ("SRAM"), non-volatile memory (e.g., flash memory), or other storage. In at least one embodiment, a choice of whether code and/or code and/or data storage 701 is internal or external to a processor, for example, or comprising DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include, or be coupled to code and/or data storage 705 to store graph code or other software to control timing and/or order, in which weight and/or other parameter information is to be loaded to configure, logic, including integer and/or floating point units (collectively, arithmetic logic units (ALUs).

In at least one embodiment, code, such as graph code, causes the loading of weight or other parameter information into processor ALUs based on an architecture of a neural network to which such code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to one or more processors or other hardware logic devices or circuits. In at least one embodiment, code and/or data storage 705 may be cache memory, DRAM, SRAM, non-volatile memory (e.g., flash memory), or other storage. In at least one embodiment, a choice of whether code and/or data storage 705 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be a combined storage structure. In at least one embodiment, code and/or data storage 701 and code and/or data storage 705 may be partially combined and partially separate. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALU(s) 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 701, code and/or data storage 705, and activation storage 720 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., flash memory), or other storage. In at least one embodiment, activation storage 720 may be completely or partially within or external to one or more processors or other logical circuits. In at least one embodiment, a choice of whether activation storage 720 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 illustrated in FIG. 7A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7A may be used in conjunction with central processing unit ("CPU") hardware, graphics processing unit ("GPU") hardware or other hardware, such as field programmable gate arrays ("FPGAs").

Figure 7B:
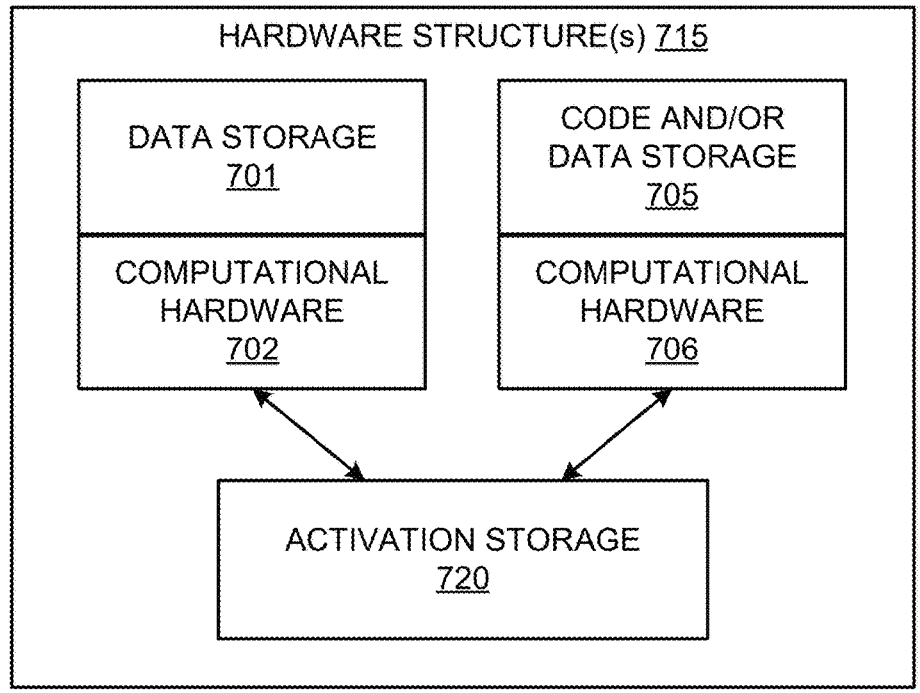
FIG. 7B illustrates inference and/or training logic, according to at least one embodiment.

FIG. 7B illustrates inference and/or training logic 715, according to at least one embodiment. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7B may be used in conjunction with central processing unit (CPU) hardware, graphics processing unit (GPU) hardware or other hardware, such as field programmable gate arrays (FPGAs). In at least one embodiment, inference and/or training logic 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7B, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 105 and corresponding computational hardware 702 and 706, respectively, correspond to different layers of a neural network, such that resulting activation from one storage/computational pair 701/702 of code and/or data storage 701 and computational hardware 702 is provided as an input to a next storage/computational pair 705/706 of code and/or data storage 705 and computational hardware 706, in order to mirror a conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage/computation pairs 701/702 and 705/706 may be included in inference and/or training logic 715.

Neural Network Training and Deployment

Figure 8:
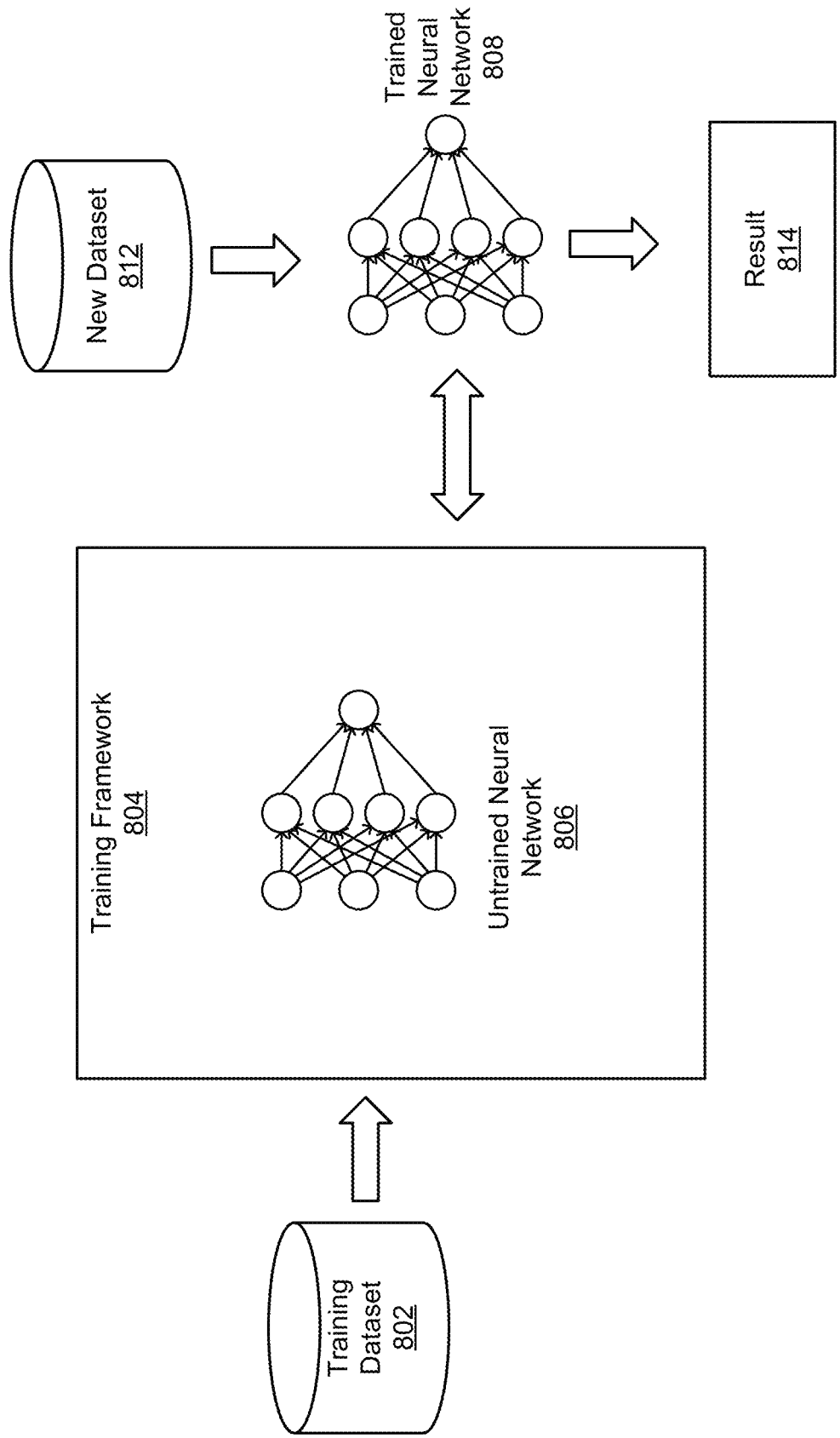
FIG. 8 illustrates training and deployment of a neural network, according to at least one embodiment.

FIG. 8 illustrates training and deployment of a deep neural network, according to at least one embodiment. In at least one embodiment, untrained neural network 806 is trained using a training dataset 802. In at least one embodiment, training framework 804 is a PyTorch framework, whereas in other embodiments, training framework 804 is a TensorFlow, Boost, Caffe, Microsoft Cognitive Toolkit/CNTK, MXNet, Chainer, Keras, Deeplearning4j, or other training framework. In at least one embodiment, training framework 804 trains an untrained neural network 806 and enables it to be trained using processing resources described herein to generate a trained neural network 808. In at least one embodiment, weights may be chosen randomly or by pre-training using a deep belief network. In at least one embodiment, training may be performed in either a supervised, partially supervised, or unsupervised manner.

In at least one embodiment, untrained neural network 806 is trained using supervised learning, wherein training dataset 802 includes an input paired with a desired output for an input, or where training dataset 802 includes input having a known output and an output of neural network 806 is manually graded. In at least one embodiment, untrained neural network 806 is trained in a supervised manner and processes inputs from training dataset 802 and compares resulting outputs against a set of expected or desired outputs. In at least one embodiment, errors are then propagated back through untrained neural network 806. In at least one embodiment, training framework 804 adjusts weights that control untrained neural network 806. In at least one embodiment, training framework 804 includes tools to monitor how well untrained neural network 806 is converging towards a model, such as trained neural network 808, suitable to generating correct answers, such as in result 814, based on input data such as a new dataset 812. In at least one embodiment, training framework 804 trains untrained neural network 806 repeatedly while adjust weights to refine an output of untrained neural network 806 using a loss function and adjustment algorithm, such as stochastic gradient descent. In at least one embodiment, training framework 804 trains untrained neural network 806 until untrained neural network 806 achieves a desired accuracy. In at least one embodiment, trained neural network 808 can then be deployed to implement any number of machine learning operations.

In at least one embodiment, untrained neural network 806 is trained using unsupervised learning, wherein untrained neural network 806 attempts to train itself using unlabeled data. In at least one embodiment, unsupervised learning training dataset 802 will include input data without any associated output data or "ground truth" data. In at least one embodiment, untrained neural network 806 can learn groupings within training dataset 802 and can determine how individual inputs are related to untrained dataset 802. In at least one embodiment, unsupervised training can be used to generate a self-organizing map in trained neural network 808 capable of performing operations useful in reducing dimensionality of new dataset 812. In at least one embodiment, unsupervised training can also be used to perform anomaly detection, which allows identification of data points in new dataset 812 that deviate from normal patterns of new dataset 812.

In at least one embodiment, semi-supervised learning may be used, which is a technique in which in training dataset 802 includes a mix of labeled and unlabeled data. In at least one embodiment, training framework 804 may be used to perform incremental learning, such as through transferred learning techniques. In at least one embodiment, incremental learning enables trained neural network 808 to adapt to new dataset 812 without forgetting knowledge instilled within trained neural network 808 during initial training.

Figure 9:
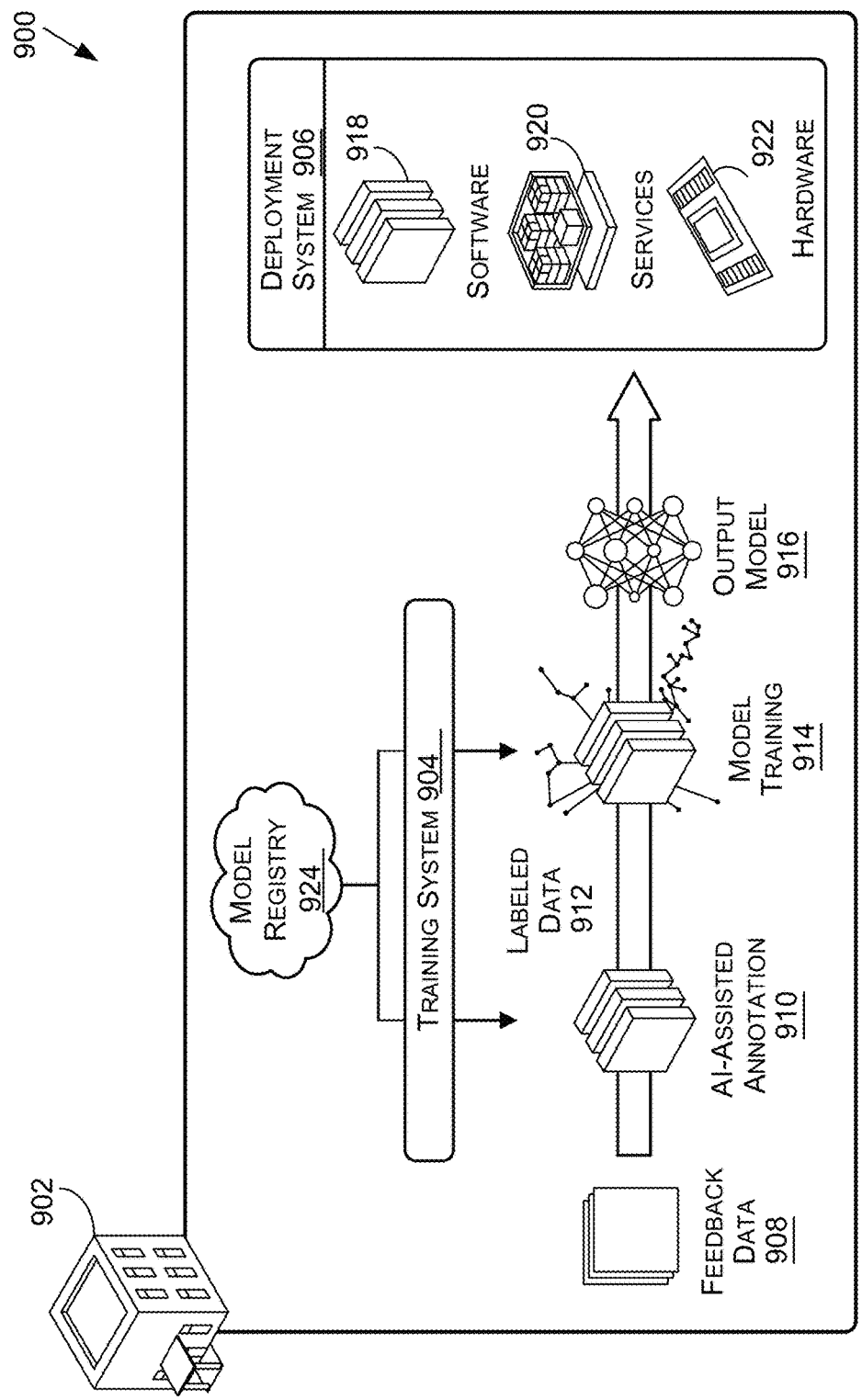
FIG. 9 is an example data flow diagram for an advanced computing pipeline, according to at least one embodiment.

With reference to FIG. 9, FIG. 9 is an example data flow diagram for a process 900 of generating and deploying a processing and inferencing pipeline, according to at least one embodiment. In at least one embodiment, process 900 may be deployed to perform game name recognition analysis and inferencing on user feedback data at one or more facilities 902, such as a data center.

In at least one embodiment, process 900 may be executed within a training system 904 and/or a deployment system 906. In at least one embodiment, training system 904 may be used to perform training, deployment, and embodiment of machine learning models (e.g., neural networks, object detection algorithms, computer vision algorithms, etc.) for use in deployment system 906. In at least one embodiment, deployment system 906 may be configured to offload processing and compute resources among a distributed computing environment to reduce infrastructure requirements at facility 902. In at least one embodiment, deployment system 906 may provide a streamlined platform for selecting, customizing, and implementing virtual instruments for use with computing devices at facility 902. In at least one embodiment, virtual instruments may include software-defined applications for performing one or more processing operations with respect to feedback data. In at least one embodiment, one or more applications in a pipeline may use or call upon services (e.g., inference, visualization, compute, AI, etc.) of deployment system 906 during execution of applications.

In at least one embodiment, some of applications used in advanced processing and inferencing pipelines may use machine learning models or other AI to perform one or more processing steps. In at least one embodiment, machine learning models may be trained at facility 902 using feedback data 908 (such as feedback data) stored at facility 902 or feedback data 908 from another facility or facilities, or a combination thereof. In at least one embodiment, training system 904 may be used to provide applications, services, and/or other resources for generating working, deployable machine learning models for deployment system 906.

In at least one embodiment, a model registry 924 may be backed by object storage that may support versioning and object metadata. In at least one embodiment, object storage may be accessible through, for example, a cloud storage (e.g., a cloud 1026 of FIG. 10) compatible application programming interface (API) from within a cloud platform. In at least one embodiment, machine learning models within model registry 924 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, a training pipeline 1004 (FIG. 10) may include a scenario where facility 902 is training their own machine learning model, or has an existing machine learning model that needs to be optimized or updated. In at least one embodiment, feedback data 908 may be received from various channels, such as forums, web forms, or the like. In at least one embodiment, once feedback data 908 is received, AI-assisted annotation 910 may be used to aid in generating annotations corresponding to feedback data 908 to be used as ground truth data for a machine learning model. In at least one embodiment, AI-assisted annotation 910 may include one or more machine learning models (e.g., convolutional neural networks (CNNs)) that may be trained to generate annotations corresponding to certain types of feedback data 908 (e.g., from certain devices) and/or certain types of anomalies in feedback data 908. In at least one embodiment, AI-assisted annotations 910 may then be used directly, or may be adjusted or fine-tuned using an annotation tool, to generate ground truth data. In at least one embodiment, in some examples, labeled data 912 may be used as ground truth data for training a machine learning model. In at least one embodiment, AI-assisted annotations 910, labeled data 912, or a combination thereof may be used as ground truth data for training a machine learning model. In at least one embodiment, a trained machine learning model may be referred to as an output model 916, and may be used by deployment system 906, as described herein.

In at least one embodiment, training pipeline 1004 (FIG. 10) may include a scenario where facility 902 needs a machine learning model for use in performing one or more processing tasks for one or more applications in deployment system 906, but facility 902 may not currently have such a machine learning model (or may not have a model that is optimized, efficient, or effective for such purposes). In at least one embodiment, an existing machine learning model may be selected from model registry 924. In at least one embodiment, model registry 924 may include machine learning models trained to perform a variety of different inference tasks on imaging data. In at least one embodiment, machine learning models in model registry 924 may have been trained on imaging data from different facilities than facility 902 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises (e.g., to comply with HIPAA regulations, privacy regulations, etc.). In at least one embodiment, once a model is trained—or partially trained—at one location, a machine learning model may be added to model registry 924. In at least one embodiment, a machine learning model may then be retrained, or updated, at any number of other facilities, and a retrained or updated model may be made available in model registry 924. In at least one embodiment, a machine learning model may then be selected from model registry 924—and referred to as output model 916—and may be used in deployment system 906 to perform one or more processing tasks for one or more applications of a deployment system.

In at least one embodiment, training pipeline 1004 (FIG. 10) may be used in a scenario that includes facility 902 requiring a machine learning model for use in performing one or more processing tasks for one or more applications in deployment system 906, but facility 902 may not currently have such a machine learning model (or may not have a model that is optimized, efficient, or effective for such purposes). In at least one embodiment, a machine learning model selected from model registry 924 might not be fine-tuned or optimized for feedback data 908 generated at facility 902 because of differences in populations, genetic variations, robustness of training data used to train a machine learning model, diversity in anomalies of training data, and/or other issues with training data. In at least one embodiment, AI-assisted annotation 910 may be used to aid in generating annotations corresponding to feedback data 908 to be used as ground truth data for retraining or updating a machine learning model. In at least one embodiment, labeled data 912 may be used as ground truth data for training a machine learning model. In at least one embodiment, retraining or updating a machine learning model may be referred to as model training 914. In at least one embodiment, model training 914—e.g., AI-assisted annotations 910, labeled data 912, or a combination thereof—may be used as ground truth data for retraining or updating a machine learning model.

In at least one embodiment, deployment system 906 may include software 918, services 920, hardware 922, and/or other components, features, and functionality. In at least one embodiment, deployment system 906 may include a software "stack," such that software 918 may be built on top of services 920 and may use services 920 to perform some or all of processing tasks, and services 920 and software 918 may be built on top of hardware 922 and use hardware 922 to execute processing, storage, and/or other compute tasks of deployment system 906.

In at least one embodiment, software 918 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, for each type of computing device there may be any number of containers that may perform a data processing task with respect to feedback data 908 (or other data types, such as those described herein). In at least one embodiment, an advanced processing and inferencing pipeline may be defined based on selections of different containers that are desired or required for processing feedback data 908, in addition to containers that receive and configure imaging data for use by each container and/or for use by facility 902 after processing through a pipeline (e.g., to convert outputs back to a usable data type for storage and display at facility 902). In at least one embodiment, a combination of containers within software 918 (e.g., that make up a pipeline) may be referred to as a virtual instrument (as described in more detail herein), and a virtual instrument may leverage services 920 and hardware 922 to execute some or all processing tasks of applications instantiated in containers.

In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 916 of training system 904.

In at least one embodiment, tasks of data processing pipeline may be encapsulated in a container(s) that each represent a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 924 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers may develop, publish, and store applications (e.g., as containers) for performing processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 920 as a system (e.g., system 1000 of FIG. 10). In at least one embodiment, once validated by system 1000 (e.g., for accuracy, etc.), an application may be available in a container registry for selection and/or embodiment by a user (e.g., a hospital, clinic, lab, healthcare provider, etc.) to perform one or more processing tasks with respect to data at a facility (e.g., a second facility) of a user.

Figure 10:
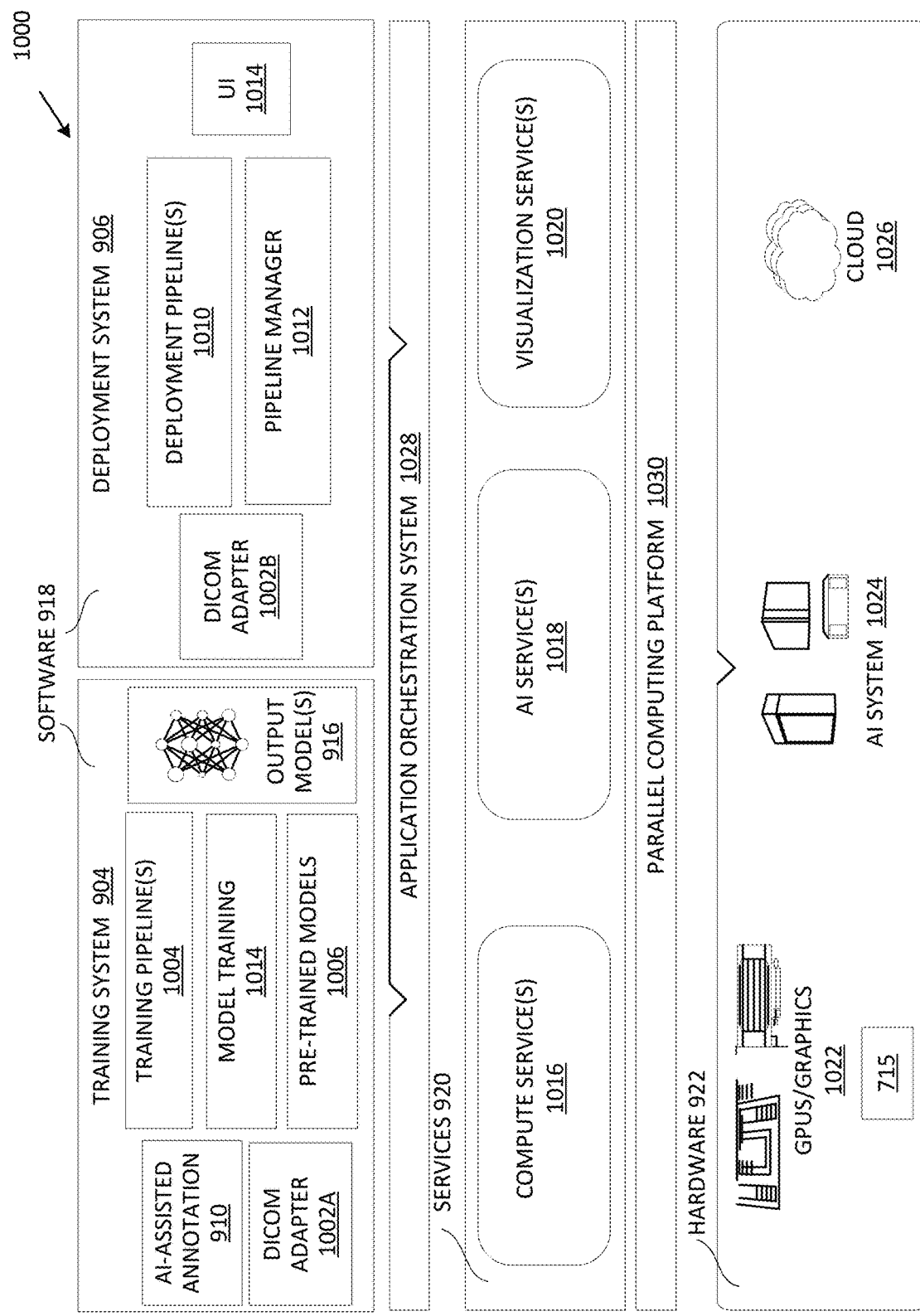
FIG. 10 is a system diagram for an example system for training, adapting, instantiating and deploying machine learning models in an advanced computing pipeline, according to at least one embodiment.

In at least one embodiment, developers may then share applications or containers through a network for access and use by users of a system (e.g., system 1000 of FIG. 10). In at least one embodiment, completed and validated applications or containers may be stored in a container registry and associated machine learning models may be stored in model registry 924. In at least one embodiment, a requesting entity—who provides an inference or image processing request—may browse a container registry and/or model registry 924 for an application, container, dataset, machine learning model, etc., select a desired combination of elements for inclusion in data processing pipeline, and submit an processing request. In at least one embodiment, a request may include input data that is necessary to perform a request, and/or may include a selection of application(s) and/or machine learning models to be executed in processing a request. In at least one embodiment, a request may then be passed to one or more components of deployment system 906 (e.g., a cloud) to perform processing of data processing pipeline. In at least one embodiment, processing by deployment system 906 may include referencing selected elements (e.g., applications, containers, models, etc.) from a container registry and/or model registry 924. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 920 may be leveraged. In at least one embodiment, services 920 may include compute services, collaborative content creation services, simulation services, artificial intelligence (AI) services, visualization services, and/or other service types. In at least one embodiment, services 920 may provide functionality that is common to one or more applications in software 918, so functionality may be abstracted to a service that may be called upon or leveraged by applications. In at least one embodiment, functionality provided by services 920 may run dynamically and more efficiently, while also scaling well by allowing applications to process data in parallel (e.g., using a parallel computing platform 1030 (FIG. 10)). In at least one embodiment, rather than each application that shares a same functionality offered by a service 920 being required to have a respective instance of service 920, service 920 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities.

In at least one embodiment, where a service 920 includes an AI service (e.g., an inference service), one or more machine learning models associated with an application for anomaly detection (e.g., tumors, growth abnormalities, scarring, etc.) may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 918 implementing advanced processing and inferencing pipeline may be streamlined because each application may call upon a same inference service to perform one or more inferencing tasks.

In at least one embodiment, hardware 922 may include GPUs, CPUs, graphics cards, an AI/deep learning system (e.g., an AI supercomputer, such as NVIDIA's DGX supercomputer system), a cloud platform, or a combination thereof. In at least one embodiment, different types of hardware 922 may be used to provide efficient, purpose-built support for software 918 and services 920 in deployment system 906. In at least one embodiment, use of GPU processing may be implemented for processing locally (e.g., at facility 902), within an AI/deep learning system, in a cloud system, and/or in other processing components of deployment system 906 to improve efficiency, accuracy, and efficacy of game name recognition.

In at least one embodiment, software 918 and/or services 920 may be optimized for GPU processing with respect to deep learning, machine learning, and/or high-performance computing, simulation, and visual computing, as non-limiting examples. In at least one embodiment, at least some of computing environment of deployment system 906 and/or training system 904 may be executed in a datacenter one or more supercomputers or high performance computing systems, with GPU optimized software (e.g., hardware and software combination of NVIDIA's DGX system). In at least one embodiment, hardware 922 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC) may be executed using an AI/deep learning supercomputer(s) and/or GPU-optimized software (e.g., as provided on NVIDIA's DGX systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 10 is a system diagram for an example system 1000 for generating and deploying a deployment pipeline, according to at least one embodiment. In at least one embodiment, system 1000 may be used to implement process 900 of FIG. 9 and/or other processes including advanced processing and inferencing pipelines. In at least one embodiment, system 1000 may include training system 904 and deployment system 906. In at least one embodiment, training system 904 and deployment system 906 may be implemented using software 918, services 920, and/or hardware 922, as described herein.

In at least one embodiment, system 1000 (e.g., training system 904 and/or deployment system 3006) may implemented in a cloud computing environment (e.g., using cloud 1026). In at least one embodiment, system 1000 may be implemented locally with respect to a facility, or as a combination of both cloud and local computing resources. In at least one embodiment, access to APIs in cloud 1026 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1000, may be restricted to a set of public Ips that have been vetted or authorized for interaction.

In at least one embodiment, various components of system 1000 may communicate between and among one another using any of a variety of different network types, including but not limited to local area networks (LANs) and/or wide area networks (WANs) via wired and/or wireless communication protocols. In at least one embodiment, communication between facilities and components of system 1000 (e.g., for transmitting inference requests, for receiving results of inference requests, etc.) may be communicated over a data bus or data busses, wireless data protocols (Wi-Fi), wired data protocols (e.g., Ethernet), etc.

In at least one embodiment, training system 904 may execute training pipelines 1004, similar to those described herein with respect to FIG. 9. In at least one embodiment, where one or more machine learning models are to be used in deployment pipelines 1010 by deployment system 906, training pipelines 1004 may be used to train or retrain one or more (e.g., pre-trained) models, and/or implement one or more of pre-trained models 1006 (e.g., without a need for retraining or updating). In at least one embodiment, as a result of training pipelines 1004, output model(s) 916 may be generated. In at least one embodiment, training pipelines 1004 may include any number of processing steps, AI-assisted annotation 910, labeling or annotating of feedback data 908 to generate labeled data 912, model selection from a model registry, model training 914, training, retraining, or updating models, and/or other processing steps. In at least one embodiment, for different machine learning models used by deployment system 906, different training pipelines 1004 may be used. In at least one embodiment, training pipeline 1004 similar to a first example described with respect to FIG. 9 may be used for a first machine learning model, training pipeline 1004 similar to a second example described with respect to FIG. 9 may be used for a second machine learning model, and training pipeline 1004 similar to a third example described with respect to FIG. 9 may be used for a third machine learning model. In at least one embodiment, any combination of tasks within training system 904 may be used depending on what is required for each respective machine learning model. In at least one embodiment, one or more of machine learning models may already be trained and ready for deployment so machine learning models may not undergo any processing by training system 904, and may be implemented by deployment system 906.

In at least one embodiment, output model(s) 916 and/or pre-trained model(s) 1006 may include any types of machine learning models depending on embodiment or embodiment. In at least one embodiment, and without limitation, machine learning models used by system 1000 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Bi-LSTM, Hopfield, Boltzmann, deep belief, deconvolutional, generative adversarial, liquid state machine, etc.), and/or other types of machine learning models.

In at least one embodiment, training pipelines 1004 may include AI-assisted annotation. In at least one embodiment, labeled data 912 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of feedback data 908 (or other data type used by machine learning models), there may be corresponding ground truth data generated by training system 904. In at least one embodiment, AI-assisted annotation may be performed as part of deployment pipelines 1010; either in addition to, or in lieu of AI-assisted annotation included in training pipelines 1004. In at least one embodiment, system 1000 may include a multi-layer platform that may include a software layer (e.g., software 918) of diagnostic applications (or other application types) that may perform one or more medical imaging and diagnostic functions.

In at least one embodiment, a software layer may be implemented as a secure, encrypted, and/or authenticated API through which applications or containers may be invoked (e.g., called) from an external environment(s) (e.g., facility 902). In at least one embodiment, applications may then call or execute one or more services 920 for performing compute, AI, or visualization tasks associated with respective applications, and software 918 and/or services 920 may leverage hardware 922 to perform processing tasks in an effective and efficient manner.

In at least one embodiment, deployment system 906 may execute deployment pipelines 1010. In at least one embodiment, deployment pipelines 1010 may include any number of applications that may be sequentially, non-sequentially, or otherwise applied to feedback data (and/or other data types)—including AI-assisted annotation, as described above. In at least one embodiment, as described herein, a deployment pipeline 1010 for an individual device may be referred to as a virtual instrument for a device. In at least one embodiment, for a single device, there may be more than one deployment pipeline 1010 depending on information desired from data generated by a device.

In at least one embodiment, applications available for deployment pipelines 1010 may include any application that may be used for performing processing tasks on feedback data or other data from devices. In at least one embodiment, because various applications may share common image operations, in some embodiments, a data augmentation library (e.g., as one of services 920) may be used to accelerate these operations. In at least one embodiment, to avoid bottlenecks of conventional processing approaches that rely on CPU processing, parallel computing platform 1030 may be used for GPU acceleration of these processing tasks.

In at least one embodiment, deployment system 906 may include a user interface 1014 (e.g., a graphical user interface, a web interface, etc.) that may be used to select applications for inclusion in deployment pipeline(s) 1010, arrange applications, modify or change applications or parameters or constructs thereof, use and interact with deployment pipeline(s) 1010 during set-up and/or deployment, and/or to otherwise interact with deployment system 906. In at least one embodiment, although not illustrated with respect to training system 904, user interface 1014 (or a different user interface) may be used for selecting models for use in deployment system 906, for selecting models for training, or retraining, in training system 904, and/or for otherwise interacting with training system 904.

In at least one embodiment, pipeline manager 1012 may be used, in addition to an application orchestration system 1028, to manage interaction between applications or containers of deployment pipeline(s) 1010 and services 920 and/or hardware 922. In at least one embodiment, pipeline manager 1012 may be configured to facilitate interactions from application to application, from application to service 920, and/or from application or service to hardware 922. In at least one embodiment, although illustrated as included in software 918, this is not intended to be limiting, and in some examples pipeline manager 1012 may be included in services 920. In at least one embodiment, application orchestration system 1028 (e.g., Kubernetes, DOCKER, etc.) may include a container orchestration system that may group applications into containers as logical units for coordination, management, scaling, and deployment. In at least one embodiment, by associating applications from deployment pipeline(s) 1010 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1012 and application orchestration system 1028. In at least one embodiment, so long as an expected input and/or output of each container or application is known by a system (e.g., based on constructs of applications or containers), application orchestration system 1028 and/or pipeline manager 1012 may facilitate communication among and between, and sharing of resources among and between, each of applications or containers. In at least one embodiment, because one or more of applications or containers in deployment pipeline(s) 1010 may share same services and resources, application orchestration system 1028 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1028) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 920 leveraged by and shared by applications or containers in deployment system 906 may include compute services 1016, collaborative content creation services 1017, AI services 1018, simulation services 1019, visualization services 1020, and/or other service types. In at least one embodiment, applications may call (e.g., execute) one or more of services 920 to perform processing operations for an application. In at least one embodiment, compute services 1016 may be leveraged by applications to perform super-computing or other high-performance computing (HPC) tasks. In at least one embodiment, compute service(s) 1016 may be leveraged to perform parallel processing (e.g., using a parallel computing platform 1030) for processing data through one or more of applications and/or one or more tasks of a single application, substantially simultaneously. In at least one embodiment, parallel computing platform 1030 (e.g., NVIDIA's CUDA) may enable general purpose computing on GPUs (GPGPU) (e.g., GPUs 1022). In at least one embodiment, a software layer of parallel computing platform 1030 may provide access to virtual instruction sets and parallel computational elements of GPUs, for execution of compute kernels. In at least one embodiment, parallel computing platform 1030 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1030 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1018 may be leveraged to perform inferencing services for executing machine learning model(s) associated with applications (e.g., tasked with performing one or more processing tasks of an application). In at least one embodiment, AI services 1018 may leverage AI system 1024 to execute machine learning model(s) (e.g., neural networks, such as CNNs) for segmentation, reconstruction, object detection, feature detection, classification, and/or other inferencing tasks. In at least one embodiment, applications of deployment pipeline(s) 1010 may use one or more of output models 916 from training system 904 and/or other models of applications to perform inference on imaging data (e.g., DICOM data, RIS data, CIS data, REST compliant data, RPC data, raw data, etc.). In at least one embodiment, two or more examples of inferencing using application orchestration system 1028 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1028 may distribute (e.g., services 920 and/or hardware 922) based on priority paths for different inferencing tasks of AI services 1018.

In at least one embodiment, shared storage may be mounted to AI services 1018 within system 1000. In at least one embodiment, shared storage may operate as a cache (or other storage device type) and may be used to process inference requests from applications. In at least one embodiment, when an inference request is submitted, a request may be received by a set of API instances of deployment system 906, and one or more instances may be selected (e.g., for best fit, for load balancing, etc.) to process a request. In at least one embodiment, to process a request, a request may be entered into a database, a machine learning model may be located from model registry 924 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1012) may be used to launch an application that is referenced in a request if an application is not already running or if there are not enough instances of an application. In at least one embodiment, if an inference server is not already launched to execute a model, an inference server may be launched. In at least one embodiment, any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT less than one minute) priority while others may have lower priority (e.g., TAT less than 10 minutes). In at least one embodiment, model execution times may be measured from requesting institution or entity and may include partner network traversal time, as well as execution on an inference service.

In at least one embodiment, transfer of requests between services 920 and inference applications may be hidden behind a software development kit (SDK), and robust transport may be provide through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. In at least one embodiment, results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1026, and an inference service may perform inferencing on a GPU.

In at least one embodiment, visualization services 1020 may be leveraged to generate visualizations for viewing outputs of applications and/or deployment pipeline(s) 1010. In at least one embodiment, GPUs 1022 may be leveraged by visualization services 1020 to generate visualizations. In at least one embodiment, rendering effects, such as ray-tracing or other light transport simulation techniques, may be implemented by visualization services 1020 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1020 may include an internal visualizer, cinematics, and/or other rendering or image processing capabilities or functionality (e.g., ray tracing, rasterization, internal optics, etc.).

In at least one embodiment, hardware 922 may include GPUs 1022, AI system 1024, cloud 1026, and/or any other hardware used for executing training system 904 and/or deployment system 906. In at least one embodiment, GPUs 1022 (e.g., NVIDIA's TESLA and/or QUADRO GPUs) may include any number of GPUs that may be used for executing processing tasks of compute services 1016, collaborative content creation services 1017, AI services 1018, simulation services 1019, visualization services 1020, other services, and/or any of features or functionality of software 918. For example, with respect to AI services 1018, GPUs 1022 may be used to perform pre-processing on imaging data (or other data types used by machine learning models), post-processing on outputs of machine learning models, and/or to perform inferencing (e.g., to execute machine learning models). In at least one embodiment, cloud 1026, AI system 1024, and/or other components of system 1000 may use GPUs 1022. In at least one embodiment, cloud 1026 may include a GPU-optimized platform for deep learning tasks. In at least one embodiment, AI system 1024 may use GPUs, and cloud 1026—or at least a portion tasked with deep learning or inferencing—may be executed using one or more AI systems 1024. As such, although hardware 922 is illustrated as discrete components, this is not intended to be limiting, and any components of hardware 922 may be combined with, or leveraged by, any other components of hardware 922.

In at least one embodiment, AI system 1024 may include a purpose-built computing system (e.g., a super-computer or an HPC) configured for inferencing, deep learning, machine learning, and/or other artificial intelligence tasks. In at least one embodiment, AI system 1024 (e.g., NVIDIA's DGX) may include GPU-optimized software (e.g., a software stack) that may be executed using a plurality of GPUs 1022, in addition to CPUs, RAM, storage, and/or other components, features, or functionality. In at least one embodiment, one or more AI systems 1024 may be implemented in cloud 1026 (e.g., in a data center) for performing some or all of AI-based processing tasks of system 1000.

In at least one embodiment, cloud 1026 may include a GPU-accelerated infrastructure (e.g., NVIDIA's NGC) that may provide a GPU-optimized platform for executing processing tasks of system 1000. In at least one embodiment, cloud 1026 may include an AI system(s) 1024 for performing one or more of AI-based tasks of system 1000 (e.g., as a hardware abstraction and scaling platform). In at least one embodiment, cloud 1026 may integrate with application orchestration system 1028 leveraging multiple GPUs to enable seamless scaling and load balancing between and among applications and services 920. In at least one embodiment, cloud 1026 may tasked with executing at least some of services 920 of system 1000, including compute services 1016, AI services 1018, and/or visualization services 1020, as described herein. In at least one embodiment, cloud 1026 may perform small and large batch inference (e.g., executing NVIDIA's TENSOR RT), provide an accelerated parallel computing API and platform 1030 (e.g., NVIDIA's CUDA), execute application orchestration system 1028 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1000.

In at least one embodiment, in an effort to preserve patient confidentiality (e.g., where patient data or records are to be used off-premises), cloud 1026 may include a registry—such as a deep learning container registry. In at least one embodiment, a registry may store containers for instantiations of applications that may perform pre-processing, post-processing, or other processing tasks on patient data. In at least one embodiment, cloud 1026 may receive data that includes patient data as well as sensor data in containers, perform requested processing for just sensor data in those containers, and then forward a resultant output and/or visualizations to appropriate parties and/or devices (e.g., on-premises medical devices used for visualization or diagnoses), all without having to extract, store, or otherwise access patient data. In at least one embodiment, confidentiality of patient data is preserved in compliance with HIPAA and/or other data regulations.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example embodiments of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:

identifying a first image and a first reference image;

determining a first plurality of motion vectors (MVs), each of the first plurality of MVs characterizing displacement of one or more pixels of the first image relative to the first reference image;

identifying, using the first plurality of MVs, a first region of the first image, the first region comprising a depiction of one or more objects in the first image;

selecting, based on a size of the first region, a first machine learning model (MLM) of a plurality of MLMs, each of the plurality of MLMs corresponding to a respective one of a plurality of input sizes;

selecting, based on the size of the first region and an input size corresponding to the first MLM, a first portion of the first image, wherein the first portion comprises the first region; and detecting a presence of the one or more objects in the first image based on an output of processing of the first portion using the first MLM.

2. The method of claim 1, wherein the first portion of the first image is selected to have a size that is equal to the input size corresponding to the first MLM.

3. The method of claim 1, wherein the first portion of the first image is selected to have a size that is different from the input size corresponding the first MLM, the method further comprising:
rescaling, prior to processing of the first portion by the first MLM, the first portion of the first image to match the input size corresponding to the first MLM.

4. The method of claim 1, wherein the output of processing of the first portion by the first MLM comprises a bounding box for at least one object of the one or more objects in the first image.

5. The method of claim 1, further comprising:
identifying a second image and a second reference image;
determining a second plurality of motion vectors (MVs), each of the second plurality of MVs characterizing displacement of one or more pixels of the second image relative to the second reference image;
identifying, using the second plurality of MVs, a second region of the second image, the second region comprising a depiction of one or more objects in the second image;
selecting, based on a size of the second region, a second machine learning model (MLM) of the plurality of MLMs, wherein an input size corresponding to the second MLM is different from the input size corresponding to the first MLM;
selecting, based on the size of the second region and the input size corresponding to the second MLM, a second portion of the second image, wherein the second portion comprises the second region; and
detecting presence of the one or more objects in the second image using an output of processing of the second portion using the second MLM.

6. The method of claim 5, further comprising classifying the one or more objects in the first image and the one or more objects in the second image, by:
processing a combined input using one or more classifier MLMs, wherein the combined input comprises:
the output of processing of the first portion using the first MLM, and
the output of processing of the second portion using the second MLM, and
wherein the one or more classifier MLMs are trained to determine a type of one or more objects depicted in the combined input.

7. The method of claim 6, wherein an output produced using the one or more classifier MLMs comprises one or more inferences corresponding to i) a type of a vehicle, ii) a make of the vehicle, or iii) a model of the vehicle, for at least one object of the one or more objects in at least one of the first image or the second image.

8. The method of claim 6, wherein the combined input processed using the one or more classifier MLMs is one of a plurality of combined inputs, and wherein the one or more classifier MLMs are configured to perform pipelined processing of the plurality of combined inputs.

9. The method of claim 5, wherein the first image and the first reference image are obtained by a first camera, wherein the second image and the second reference image are obtained by a second camera, and wherein a field of view of the first camera is different from a field of view of the second camera.

10. The method of claim 1, wherein processing of the first portion using the first MLM comprises executing one or more computations associated with the first MLM using one or more graphics processing units.

11. A system comprising:
a memory device; and
one or more processing devices, communicatively coupled to the memory device, to:
identify a first image and a first reference image;
determine a first plurality of motion vectors (MVs), each of the first plurality of MVs characterizing displacement of one or more pixels of the first image relative to the first reference image;
identify, using the first plurality of MVs, a first region of the first image, the first region comprising a depiction of one or more objects in the first image;
select, based on a size of the first region, a first machine learning model (MLM) of a plurality of MLMs, each of the plurality of MLMs corresponding to a respective one of a plurality of input sizes;
select, based on the size of the first region and an input size corresponding to the first MLM, a first portion of the first image, wherein the first portion comprises the first region; and
detect presence of the one or more objects in the first image based on an output of processing of the first portion using the first MLM.

12. The system of claim 11, wherein the first portion of the first image is selected to have a size that is equal to the input size corresponding to the first MLM.

13. The system of claim 11, wherein the first portion of the first image is selected to have a size that is different from the input size corresponding to the first MLM, and wherein the one or more processing devices are further to:
rescale, prior to processing of the first portion using the first MLM, the first portion of the first image to match the input size corresponding to the first MLM.

14. The system of claim 11, wherein the one or more processing devices are further to:
identify a second image and a second reference image;
determine a second plurality of motion vectors (MVs), each of the second plurality of MVs characterizing displacement of one or more pixels of the second image relative to the second reference image;
identify, using the second plurality of MVs, a second region of the second image, the second region comprising a depiction of one or more objects in the second image;
select, based on a size of the second region, a second machine learning model (MLM) of the plurality of MLMs, wherein an input size corresponding to the second MLM is different from the input size corresponding to the first MLM;
select, based on the size of the second region and the input size of the second MLM, a second portion of the second image, wherein the second portion comprises the second region; and
detect presence of the one or more objects in the second image using an output of processing of the second portion using the second MLM.

15. The system of claim 14, wherein the one or more processing devices are further to:
process a combined input using one or more classifier MLMs, wherein the combined input comprises:
the output of processing of the first portion using the first MLM, and
the output of processing of the second portion using the second MLM, and
wherein the one or more classifier MLMs are trained to determine a type of one or more objects depicted in the combined input.

16. The system of claim 15, wherein an output produced using the one or more classifier MLMs comprises one or more inferences corresponding to i) a type of a vehicle, ii) a make of the vehicle, or iii) a model of the vehicle, for at one object of the one or more objects in at least one of the first image or the second image.

17. The system of claim 11, wherein the one or more processing devices comprise one or more graphics processing units.

18. A non-transitory computer-readable medium storing instructions thereon, wherein the instructions, when executed by a processing device, cause the processing device to:
- identify a first image and a first reference image;
- determine a first plurality of motion vectors (MVs), each of the first plurality of MVs characterizing displacement of one or more pixels of the first image relative to the first reference image;
- identify, using the first plurality of MVs, a first region of the first image, the first region comprising a depiction of one or more objects in the first image;
- select, based on a size of the first region, a first machine learning model (MLM) of a plurality of MLMs, each of the plurality of MLMs corresponding to a respective one of a plurality of input sizes;
- select, based on the size of the first region and an input size corresponding to the first MLM, a first portion of the first image, wherein the first portion comprises the first region; and
- detect presence of the one or more objects in the first image based on an output of processing of the first portion using the first MLM.

19. The non-transitory computer-readable medium of claim 18, wherein the instructions are further to cause the processing device to:
- identify a second image and a second reference image;
- determine a second plurality of motion vectors (MVs), each of the second plurality of MVs characterizing displacement of one or more pixels of the second image relative to the second reference image;
- identify, using the second plurality of MVs, a second region of the second image, the second region comprising a depiction of one or more objects in the second image;
- select, based on a size of the second region, a second machine learning model (MLM) of the plurality of MLMs, wherein an input size corresponding to the second MLM is different from the input size corresponding to the first MLM;
- select, based on the size of the second region and the input size of the second MLM, a second portion of the second image, wherein the second portion comprises the second region; and
- detect presence of the one or more objects in the second image based on an output of processing of the second portion using the second MLM.

20. The non-transitory computer-readable medium of claim 19, wherein the instructions are further to cause the processing device to:
- process a combined input using one or more classifier MLMs, wherein the combined input comprises:
  - the output of processing of the first portion using the first MLM, and
  - the output of processing of the second portion using the second MLM, and
- wherein the one or more classifier MLMs are trained to determine a type of one or more objects depicted in the combined input.

* * * * *